United States Patent
Takahashi et al.

(10) Patent No.: US 11,044,061 B2
(45) Date of Patent: Jun. 22, 2021

(54) TERMINAL APPARATUS, COMMUNICATION METHOD, AND INTEGRATED CIRCUIT

(71) Applicants: Sharp Kabushiki Kaisha, Osaka (JP); FG Innovation Company Limited, New Territories (HK)

(72) Inventors: Hiroki Takahashi, Sakai (JP); Shohei Yamada, Sakai (JP); Hidekazu Tsuboi, Sakai (JP); Kazunari Yokomakura, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/495,857

(22) PCT Filed: Mar. 23, 2018

(86) PCT No.: PCT/JP2018/011760
§ 371 (c)(1),
(2) Date: Sep. 20, 2019

(87) PCT Pub. No.: WO2018/174257
PCT Pub. Date: Sep. 27, 2018

(65) Prior Publication Data
US 2020/0076556 A1    Mar. 5, 2020

(30) Foreign Application Priority Data
Mar. 23, 2017 (JP) ............................. JP2017-057404

(51) Int. Cl.
*H04L 5/00* (2006.01)
*H04W 24/10* (2009.01)
(Continued)

(52) U.S. Cl.
CPC ......... *H04L 5/0048* (2013.01); *H04B 7/0626* (2013.01); *H04L 1/0026* (2013.01); *H04L 5/0053* (2013.01); *H04W 24/10* (2013.01)

(58) Field of Classification Search
CPC ... H04L 5/0048; H04L 5/0053; H04L 1/0026; H04B 7/0626; H04B 7/0632; H04W 24/10
See application file for complete search history.

(56) References Cited

U.S. PATENT DOCUMENTS

2018/0234960 A1* 8/2018 Nagaraja .............. H04B 17/318
2018/0278467 A1* 9/2018 John Wilson ....... H04W 72/046
(Continued)

FOREIGN PATENT DOCUMENTS

WO    WO 2016/017498 A1    2/2016

OTHER PUBLICATIONS

Zte et al., "Discussion on beam recovery mechanism", 3GPP TSG RAN WG1 Meeting #88, R1-1701803, Feb. 13-17, 2017, 6 pages.
(Continued)

*Primary Examiner* — Paul H Masur
(74) *Attorney, Agent, or Firm* — Finnegan, Henderson, Farabow, Garrett & Dunner LLP

(57) ABSTRACT

A terminal apparatus includes a monitor unit configured to monitor qualities of a plurality of links, each being associated with at least one reference signal, a controller configured to send an indication to a higher layer in a case that qualities of a prescribed number of links among the qualities of the plurality of links are worse than a threshold, and a higher layer processing unit configured to perform a recovery request to a base station apparatus in a case of receiving a prescribed number of the indications, and end the recovery request in a case of receiving a prescribed physical downlink control channel.

9 Claims, 13 Drawing Sheets

(51) Int. Cl.
*H04L 1/00* (2006.01)
*H04B 7/06* (2006.01)

(56) References Cited

U.S. PATENT DOCUMENTS

| | | | | |
|---|---|---|---|---|
| 2019/0327634 A1* | 10/2019 | Lee | .................. | H04W 24/08 |
| 2020/0028603 A1* | 1/2020 | Wang | .................. | H04B 7/0617 |
| 2020/0244413 A1* | 7/2020 | Takeda | .................. | H04B 7/0695 |

OTHER PUBLICATIONS

Samsung, "Radio Link Failure operation in High Frequency NR systems", 3GPP TSG RAN WG2 #96, R2-168822, Nov. 14-18, 2016, 4 pages.
Intel Corporation, "Beam recovery", 3GPP TSG RAN WG2#97, R2-1701730, Feb. 13-17, 2017, 2 pages.
Nokia et al. "Beam Recovery in NR", 3GPP TSG-RAN WG2 Meeting #97, R2-1701681, Feb. 13-17, 2017, 5 pages.
Vivo, "Discussion on beam recovery", 3GPP Draft; R1-1703389_DISCUSSION on Beam Recovery, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 13, 2017-Feb. 17, 2017, Feb. 12, 2017(Feb. 12, 2017), XP051210517, Retrieved from the Internet: URL: http://www.3gpp.org/ftp/Meetings_3GPP_Sync/RAN1/Docs/ ,[retrieved on Feb. 12, 2017], *paragraph 2 *.
Samsung, "Trigger condition for beam failure recovery", 3GPP TSG RAN WG1 Meeting #88, Feb. 13-17, 2017, R1-1702939, pp. 1-4, 3GPP, Athens, Greece.
Official Communication issued in International Patent Application No. PCT/JP2018/011760, dated Jun. 12, 2018.
NTT Docomo, "Revision of SI: Study on New Radio Access Technology", 3GPP TSG RAN Meeting #72, RP-161214, Jun. 13-16, 2016, 8 pages.
Nokia et al., "Basic principles for the 5G New Radio access technology", 3GPP TSG-RAN WG1 #84bis, R1-162883, Apr. 11-15, 2016, 6 pages.
Intel Corporation, "Overview of antenna technology for new radio interface", 3GPP TSG-RAN WG1 #84bis, R1-162380, Apr. 11-15, 2016, pp. 1-3.
Ericsson, "Overview of NR", TSG-RAN WG1 #84bis, R1-163215, Apr. 11-15, 2016, 2 pages.
Catt, "Considerations on beam recovery mechanism", 3GPP TSG RAN WG1 Meeting #88, R1-1702078, Feb. 13-17, 2017, 4 pages.
CMCC, "Discussion on UE triggered beam reporting for beam recovery", 3GPP TSG RAN WG1 Meeting #88, R1-1703404, Feb. 13-17, 2017, 4 pages.
Samsung, "RLF related timer operation and beam recovery for High Frequency NR systems", 3GPP TSG-RAN WG2 Meeting # 97, R2-1701359, Feb. 13-17, 2017, 3 pages.
Guangdong OPPO Mobile Telecom, "On Beam Recovery Mechanism", 3GPP TSG RAN WG1 Meeting #88, R1-1701944, Feb. 13-17, 2017, 4 pages.
Japanese Patent Office, "Notice of Reasons for Refusal" of Application No. JP 2019-507028, dated Jul. 1, 2020 (7 pages).
Japanese Patent Office, "Decision of Refusal" of Application No. JP 2019-507028, dated Dec. 1, 2020 (6 pages).
European Patent Office, "Extended European Search Report" and "Supplementary European Search Report" of Application No. 18770310. 3-1212 / 3606168 (PCT/JP2018011760), dated Jun. 3, 2020 (10 pgs.).

* cited by examiner

TERMINAL APPARATUS, COMMUNICATION METHOD, AND INTEGRATED CIRCUIT

TECHNICAL FIELD

The present invention relates to a terminal apparatus, a communication method, and an integrated circuit.

This application claims priority based on JP 2017-057404 filed on Mar. 23, 2017, the contents of which are incorporated herein by reference.

BACKGROUND ART

Currently, as a radio access method and a radio access network technology for the fifth-generation cellular system, in The Third Generation Partnership Project (3GPP), technical study and standards formulation have been conducted for Long Term Evolution (LTE)-Advanced Pro and New Radio technology (NR) (NPL 1).

The fifth-generation cellular system requires three anticipated scenarios for services: enhanced Mobile Broadband (eMBB), which realizes high-speed, high-capacity transmission; Ultra-Reliable and Low Latency Communication (URLLC), which realizes low-latency, high-reliability communication; and massive Machine Type Communication (mMTC), which allows a large number of machine type devices to be connected in a system such as Internet of Things (IoT).

In NR, a technical study of massive MIMO (Multiple-Input Multiple-Output), which uses a large number of antenna elements at high frequencies to secure a coverage with a beamforming gain, is being conducted (NPL 2, NPL 3, NPL 4).

CITATION LIST

Non-Patent Literature

NPL 1: RP-161214, NTT DOCOMO, "Revision of SI: Study on New Radio Access Technology", June 2016
NPL 2: R1-162883 Nokia, Alcatel-Lucent Shanghai Bell, "Basic Principles for the 5G New Radio Access technology", April 2016
NPL 3: R1-162380, Intel Corporation, "Overview of antenna technology for new radio interface", April 2016
NPL 4: R1-163215, Ericsson, "Overview of NR", April 2016

SUMMARY OF INVENTION

Technical Problem

An aspect of the present invention provides a terminal apparatus capable of efficiently communicating with a base station apparatus, a base station apparatus communicating with the terminal apparatus, a communication method for use in the terminal apparatus, and a communication method for use in the base station apparatus. For example, the communication methods for use in the terminal apparatus and the base station apparatus may include an uplink transmission method, a modulation method, and/or a coding method, for efficient communication, decrease in complexity, and reduction in interference between cells and/or between terminal apparatuses.

Solution to Problem (1) According to some aspects of the present invention, the following measures are provided. Specifically, a first aspect of the present invention is a terminal apparatus including: a monitor unit configured to monitor qualities of a plurality of links, each being associated with at least one reference signal; a controller configured to send an indication to a higher layer in a case that qualities of a prescribed number of links among the qualities of the plurality of links are worse than a threshold; and a higher layer processing unit configured to perform a recovery request to a base station apparatus in a case of receiving a prescribed number of the indications, and end the recovery request in a case of receiving a prescribed physical downlink control channel.

(2) A third aspect of the present invention is a communication method used for a terminal apparatus, the communication method including: monitoring qualities of a plurality of links, each being associated with at least one reference signal; sending an indication to a higher layer in a case that qualities of a prescribed number of links among the qualities of the plurality of links are worse than a threshold; and in the higher layer, performing a recovery request to a base station apparatus in a case of receiving a prescribed number of the indications, and ending the recovery request in a case of receiving a prescribed physical downlink control channel.

(3) A fifth aspect of the present invention is an integrated circuit mounted on a terminal apparatus, the integrated circuit causing the terminal apparatus to perform: monitoring qualities of a plurality of links, each being associated with at least one reference signal; sending an indication to a higher layer in a case that qualities of a prescribed number of links among the qualities of the plurality of links are worse than a threshold; and in the higher layer, performing a recovery request to a base station apparatus in a case of receiving a prescribed number of the indications, and ending the recovery request in a case of receiving a prescribed physical downlink control channel.

Advantageous Effects of Invention

According to an aspect of the present invention, a terminal apparatus and a base station apparatus can efficiently communicate with each other and/or decrease complexity.

DESCRIPTION OF EMBODIMENTS

Embodiments of the present invention will be described below.

LTE (and LTE-Advanced Pro) and NR may be defined as different Radio Access Technologies (RATs). NR may be defined as a technology included in LTE. The present embodiment may be applied to NR, LTE and other RATs. Terms associated with LTE are used in the following description. However, the present invention may be applied to other technologies using other terms.

Figure 1:
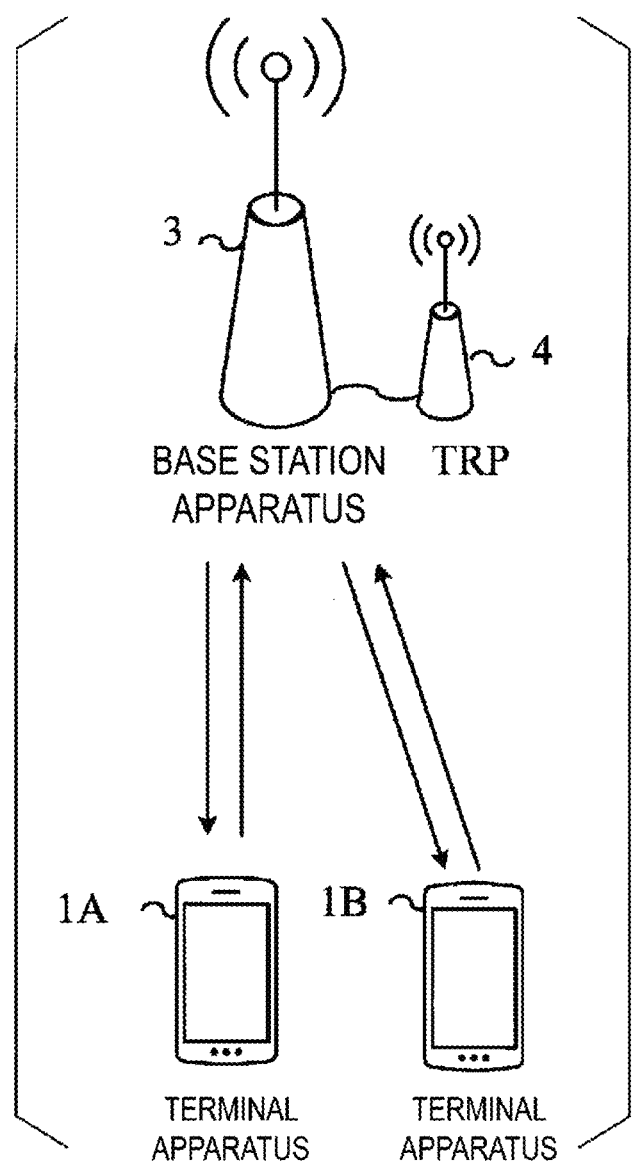
FIG. 1 is a conceptual diagram of a radio communication system according to an embodiment of the present invention.

FIG. 1 is a conceptual diagram of a radio communication system according to an embodiment of the present invention. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1.

The terminal apparatus 1 is also called a mobile station apparatus, a user terminal (User Equipment: UE), a communication terminal, a mobile apparatus, a terminal, and a Mobile Station (MS). The base station apparatus 3 is also called a radio base station apparatus, a base station, a radio base station, a fixed station, a Node B (NB), an evolved Node B (eNB), NR Node B (NR NB), next generation Node B (gNB), an access point, a Base Transceiver Station (BTS), and a Base Station (BS). The base station apparatus 3 may include a core network apparatus. The base station apparatus 3 may include one or more transmission reception points (TRPs) 4. At least some of the functions/processes of the base station apparatus 3 described below may be functions/processes at each of the transmission reception points 4 included in the base station apparatus 3. The base station apparatus 3 may have a communicable range (communication area), controlled by the base station apparatus 3, to have one or more cells to serve the terminal apparatus 2. The base station apparatus 3 may configure a communicable range (communication area), controlled by one or more transmission reception points 4, to have one or more cells to serve the terminal apparatus 1. The base station apparatus 3 may also divide one cell into multiple Beamed areas to serve the terminal apparatus 1 in each of the beamed areas. Here, a beamed area may be identified based on a beam index used for beamforming, or a precoding index.

The communication area covered by the base station apparatus 3 may vary in size and shape for each frequency. Moreover, the covered area may be different for each frequency. A radio network, in which cells having different types of base station apparatuses 3 and different cell radii coexist at the same frequency or different frequencies to form a single communication system, is referred to as a heterogeneous network.

A radio communication link from the base station apparatus 3 to the terminal apparatus 1 is referred to as a downlink. A radio communication link from the terminal apparatus 1 to the base station apparatus 3 is referred to as an uplink. A radio communication link from the terminal apparatus 1 to another terminal apparatus 1 is referred to as a sidelink.

In FIG. 1, in a radio communication between the terminal apparatus 1 and the base station apparatus 3, and/or a radio communication between the terminal apparatus 1 and another terminal apparatus 1, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, and/or the radio communication between the terminal apparatus 1 and another terminal apparatus 1, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention. For example, the OFDM symbol in the present embodiment may be SC-FDM symbols (sometimes referred to as Single-Carrier Frequency Division Multiple Access (SC-FDMA) symbols).

Furthermore, in FIG. 1, in the radio communication between the terminal apparatus 1 and the base station apparatus 3, and/or the radio communication between the terminal apparatus 1 and another terminal apparatus 1, the CP may not be used, or the above-described transmission scheme with zero padding may be used instead of the CP. Moreover, the CP or the zero padding may be added both forward and backward.

According to the present embodiment, one or more serving cells are configured for the terminal apparatus 1. The configured multiple serving cells include one Primary Cell (also referred to as a PCell) and one or more Secondary Cells (also referred to as SCells). The primary cell is a serving cell in which an initial connection establishment procedure has been performed, a serving cell in which a connection re-establishment procedure has been initiated, or a cell which has been indicated as a primary cell during a handover procedure. At the point in time when a Radio Resource Control (RRC) connection is established, or later, one or more secondary cells may be configured. Note that the configured multiple serving cells may include one primary secondary cell (also referred to as a Primary SCell, PSCell). The primary secondary cell may be a secondary cell capable of transmitting control information in the uplink among one or more secondary cells configured for the terminal apparatus 1. The terminal apparatus 1 may be configured with a subset of two types of serving cells, a master cell group (also referred to as a Master Cell Group, MCG), and a secondary cell group (also referred to as a Secondary Cell Group and SCG). The master cell group includes one primary cell and zero or more secondary cells. The secondary cell group includes one primary secondary cell and zero or more secondary cells.

Time Division Duplex (TDD) and/or Frequency Division Duplex (FDD) may be applied to the radio communication system according to the present embodiment. A Time Division Duplex (TDD) scheme or a Frequency Division Duplex (FDD) scheme may be applied to all of multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described. Note that the downlink physical channels and/or the downlink physical signals may be collectively referred to as downlink signals. The uplink physical channels and/or the uplink physical signals may be collectively referred to as uplink signals. The downlink physical channels and/or the uplink physical channels may be collectively referred to as physical channels. The downlink physical signals and/or the uplink physical signals may be collectively referred to as physical signals.

In FIG. 1, the following downlink physical channels are used for downlink radio communication between the terminal apparatus 1 and the base station apparatus 3. The downlink physical channels are used for transmitting information output from the higher layers.

New Radio Physical Broadcast Channel (NR-PBCH)
New Radio Physical Downlink Control Channel (NR-PDCCH)
New Radio Physical Downlink Shared Channel (NR-PDSCH)

The NR-PBCH is used by the base station apparatus 3 to broadcast an essential information block, such as a Master Information Block (MIB) and an Essential Information Block (EIB), which includes essential system information (Essential Information) needed by the terminal apparatus 1. Here, one or more essential information blocks may be transmitted as an essential information message. For example, the essential information block may include information indicating some or all of a frame number (System Frame Number: SFN) (e.g., information about a location in a superframe including multiple frames). For example, a radio frame (10 ms) includes 10 subframes each having 1 ms, and the radio frame is identified by a frame number. The frame number returns to 0 at 1024 (Wrap around). Furthermore, in a case that the essential information block different every area within the cell is transmitted, each essential information block may include information capable of identifying the corresponding area (for example, identifier information about a base station transmission beam constituting the area). Here, the identifier information of the base station transmission beam may be indicated by using an index of the base station transmission beam (precoding). In a case that the essential information block (essential information message) different in every area within the cell is transmitted, each essential information block may include information capable of identifying a time location within the frame (for example, a subframe number at which the essential information block (essential information message) is included). That is, the essential information block may include information for determining each of the subframe numbers at which the respective essential information blocks (essential information messages) using indexes of different base station transmission beams are transmitted. For example, the essential information may include information needed for connection to the cell or for mobility.

The NR-PDCCH is used to transmit Downlink Control Information (DCI) in a downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating a timing for transmitting HARQ-ACK for a scheduled NR-PDSCH (for example, the number of symbols from the last symbol included in the NR-PDSCH to the symbol for transmission of the HARQ-ACK).

For example, the DCI may be defined to be used for the scheduling of one downlink radio communication NR-PDSCH in one cell (transmission of one downlink transport block).

For example, the DCI may be defined to be used for the scheduling of one uplink radio communication NR-PUSCH in one cell (transmission of one uplink transport block).

Here, the DCI includes information of the scheduling of the NR-PDSCH or the NR-PUSCH. Here, the DCI for the downlink is also referred to as a downlink grant or downlink assignment. Here, the DCI for the uplink is also referred to as an uplink grant or Uplink assignment.

The NR-PDSCH is used to transmit downlink data (Downlink Shared Channel (DL-SCH)) from Medium Access Control (MAC). The NR-PDSCH is also used to transmit System Information (SI), a Random Access Response (RAR), and the like.

Here, the base station apparatus 3 and the terminal apparatus 1 exchange (transmit and/or receive) signals with each other in a higher layer. For example, the base station apparatus 3 and the terminal apparatus 1 may transmit and/or receive Radio Resource Control (RRC) signaling (also referred to as a Radio Resource Control message (RRC message) or Radio Resource Control information (RRC information)) in the Radio Resource Control (RRC) layer. The base station apparatus 3 and the terminal apparatus 1 may transmit and/or receive a Medium Access Control (MAC) control element in a MAC layer. Here, the RRC signaling and/or the MAC control element is also referred to as higher layer signaling. The higher layer herein means a higher layer viewed from the physical layer, and thus, may include one or more layers, such as a MAC layer, an RRC layer, an RLC layer, a PDCP layer, and a NAS layer. For example, the higher layer in a process of the MAC layer may include one or more layers such as an RRC layer, an RLC layer, a PDCP layer, and a NAS layer.

The NR-PDSCH may be used to transmit the RRC signaling and the MAC control element (Medium Access Control Control Element (MAC-CE)). Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1.

The NR-PRACH may be used to transmit a random access preamble. The NR-PRACH may be used to indicate an initial connection establishment procedure, a handover procedure, a connection re-establishment procedure, uplink transmission synchronization (timing adjustment), and an NR-PUSCH (UL-SCH) resource request.

In FIG. 1, the following downlink physical signals are used for the downlink radio communication. Here, the downlink physical signals are not used to transmit the information output from the higher layers but is used by the physical layer.

Synchronization signal (SS)
Reference Signal (RS)

The synchronization signal is used for the terminal apparatus 1 to take synchronization in a frequency domain and a time domain in the downlink. The synchronization signal may include a Primary Synchronization Signal (PSS) and a Second Synchronization Signal (SSS). The synchronization signal may be used for the terminal apparatus 1 to identify a Cell Identifier (cell ID). The synchronization signal may also be used to select/identify/determine a base station transmission beam to be used by the base station apparatus 3 for downlink beamforming, and/or a terminal reception beam to be used by the terminal apparatus 1. In other words, the synchronization signal may be used for the terminal apparatus 1 to select/identify/determine the index of the base station transmission beam applied to the downlink signal by the base station apparatus 3. Here, the synchronization signal, the primary synchronization signal, and the secondary synchronization signal used in NR may be referred to as NR-SS, NR-PSS, and NR-SSS, respectively.

A downlink reference signal (hereinafter, also simply referred to as a reference signal in the present embodiment) may be classified into multiple reference signals, based on applications and the like. For example, one or more of the following reference signals may be used for the reference signal.

Demodulation Reference Signal (DMRS)
Channel State Information Reference Signal (CSI-RS)
Phase Tracking Reference Signal (PTRS)
Mobility Reference Signal (MRS)

The DMRS may be used for channel compensation in demodulating a received modulated signal. The DMRS for demodulating the NR-PDSCH, the DMRS for demodulating the NR-PDCCH, and/or the DMRS for demodulating the NR-PBCH may collectively refer to as the DMRS, or may be individually defined.

The CSI-RS may be used for channel state measurement. The PTRS may be used to track a phase due to movement of the terminal or the like. The MRS may be used to measure reception quality from multiple base station apparatuses for handover.

The reference signal for compensating for a phase noise may be defined in the reference signal.

Note that functions of at least some of the multiple reference signals may be had by other reference signals.

At least one of the multiple reference signals or other reference signals may be defined as a Cell-specific reference signal (CRS) individually configured for the cell, a Beam-specific reference signal (BRS) for each transmission beam used by the base station apparatus 3 or the transmission reception point 4, and/or a UE-specific reference signal (URS) configured individually for the terminal apparatus 1.

At least one of the reference signals may be used for Fine synchronization of which the level is sufficient to perform determination of a numerology for a radio parameter or a subcarrier spacing, an FFT window synchronization, or the like.

At least one of the reference signals may be used for Radio Resource Measurement (RRM). At least one of the reference signals may be used for beam management.

A synchronization signal may be used for at least one of the reference signals.

In FIG. 1, the following uplink physical channels are used for uplink radio communication between the terminal apparatus 1 and the base station apparatus 3 (radio communication from the terminal apparatus 1 to the base station apparatus 3). The uplink physical channels are used for transmitting information output from the higher layers.

New Radio Physical Uplink Control Channel (NR-PUCCH)
New Radio Physical Uplink Shared Channel (NR-PUSCH)
New Radio Physical Random Access Channel (NR-PRACH)

The NR-PUCCH is used to transmit Uplink Control Information (UCI). Here, the uplink control information may include Channel State Information (CSI) used to indicate a downlink channel state. The uplink control information may include a Scheduling Request (SR) used to request an UL-SCH resource. The uplink control information may include a Hybrid Automatic Repeat Request Acknowledge (HARQ-ACK). The HARQ-ACK may indicate a HARQ-ACK for downlink data (Transport block, Medium Access Control Protocol Data Unit (MAC PDU), or a Downlink-Shared Channel (DL-SCH)).

The NR-PUSCH is used to transmit uplink data (Uplink Shared CHannel (UL-SCH)) from the Medium Access Control (MAC). The NR-PUSCH may be used to transmit a HARQ-ACK and/or CSI along with the uplink data. Furthermore, the NR-PUSCH may be used to transmit the HARQ-ACK and CSI only. That is, the NR-PUSCH may be used to transmit UCI only.

The NR-PUSCH may be used to transmit the RRC signaling and the MAC control element. Here, the NR-PUSCH may be used to transmit UE Capabilities in the uplink.

Note that the same reference name (for example, NR-PCCH) and the same channel definition may be used for the NR-PDCCH and the NR-PUCCH. Note that the same reference name (for example, NR-PSCH) and the same channel definition may be used for the NR-PDSCH and the NR-PUSCH.

Hereinafter, the subframe will be described. The subframe in the present embodiment may be also referred to as a resource unit, a radio frame, a time period, or a time interval.

Figure 2:
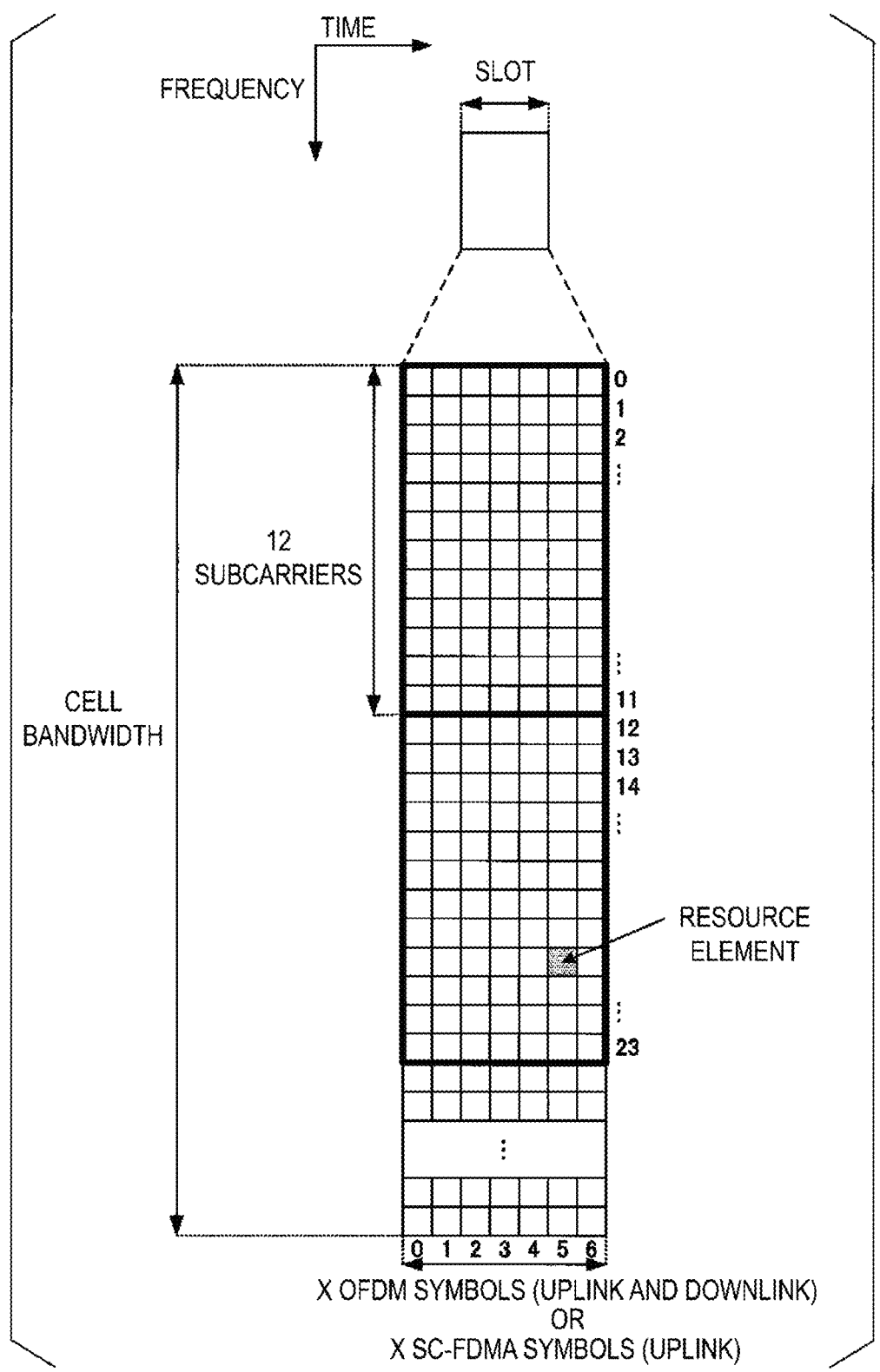
FIG. 2 is a diagram illustrating an example of a schematic configuration of a downlink slot according to the embodiment of the present invention.

FIG. 2 is a diagram illustrating an example of a schematic configuration of a downlink slot according to the embodiment of the present invention. Each of the radio frames is 10 ms in length. Each of the radio frames includes 10 subframes and X slots. In other words, the length of one subframe is 1 ms. For each of the slots, a time length is defined depending on a subcarrier spacing. For example, in a case that a subcarrier spacing of OFDM symbols is 15 kHz with an NCP (Normal Cyclic Prefix), X=7 or X=14, and 0.5 ms and 1 ms, respectively. In a case that the subcarrier spacing is 60 kHz, X=7 or X=14, and 0.125 ms and 0.25 ms, respectively. FIG. 2 illustrates a case of X=7 as an example. Note that also in a case of X=14, the same expansion can be achieved. The uplink slot may be defined similarly, and the downlink slot and the uplink slot may be defined separately.

The signal or the physical channel transmitted in each of the slots is expressed by a resource grid. The resource grid is defined by multiple subcarriers and multiple OFDM symbols. The number of subcarriers constituting one slot depends on cell downlink and uplink bandwidths. Each element within the resource grid is referred to as a resource element. The resource element may be identified by a subcarrier number and an OFDM symbol number.

A resource block is used to express mapping of resource elements for a certain physical downlink channel (such as the PDSCH) or a certain physical uplink channel (such as the PUSCH). For the resource block, a virtual resource block and a physical resource block are defined. A certain physical uplink channel is first mapped to a virtual resource block. Thereafter, the virtual resource block is mapped to the physical resource block. In the case that the number X of OFDM symbols included in a slot is 7 (X=7) with the NCP, one physical resource block is defined by seven OFDM symbols consecutive in the time domain and by 12 subcarriers consecutive in the frequency domain. Specifically, one physical resource block includes (7×12) resource elements. In a case of an Extended CP (ECP), one physical resource block is defined by six OFDM symbols consecutive in the time domain and by 12 subcarriers consecutive in the frequency domain, for example. Specifically, one physical resource block includes (6×12) resource elements. At this time, one physical resource block corresponds to one slot in the time domain and corresponds to 180 kHz in the frequency domain. The physical resource blocks are numbered from zero in the frequency domain.

Figure 3:
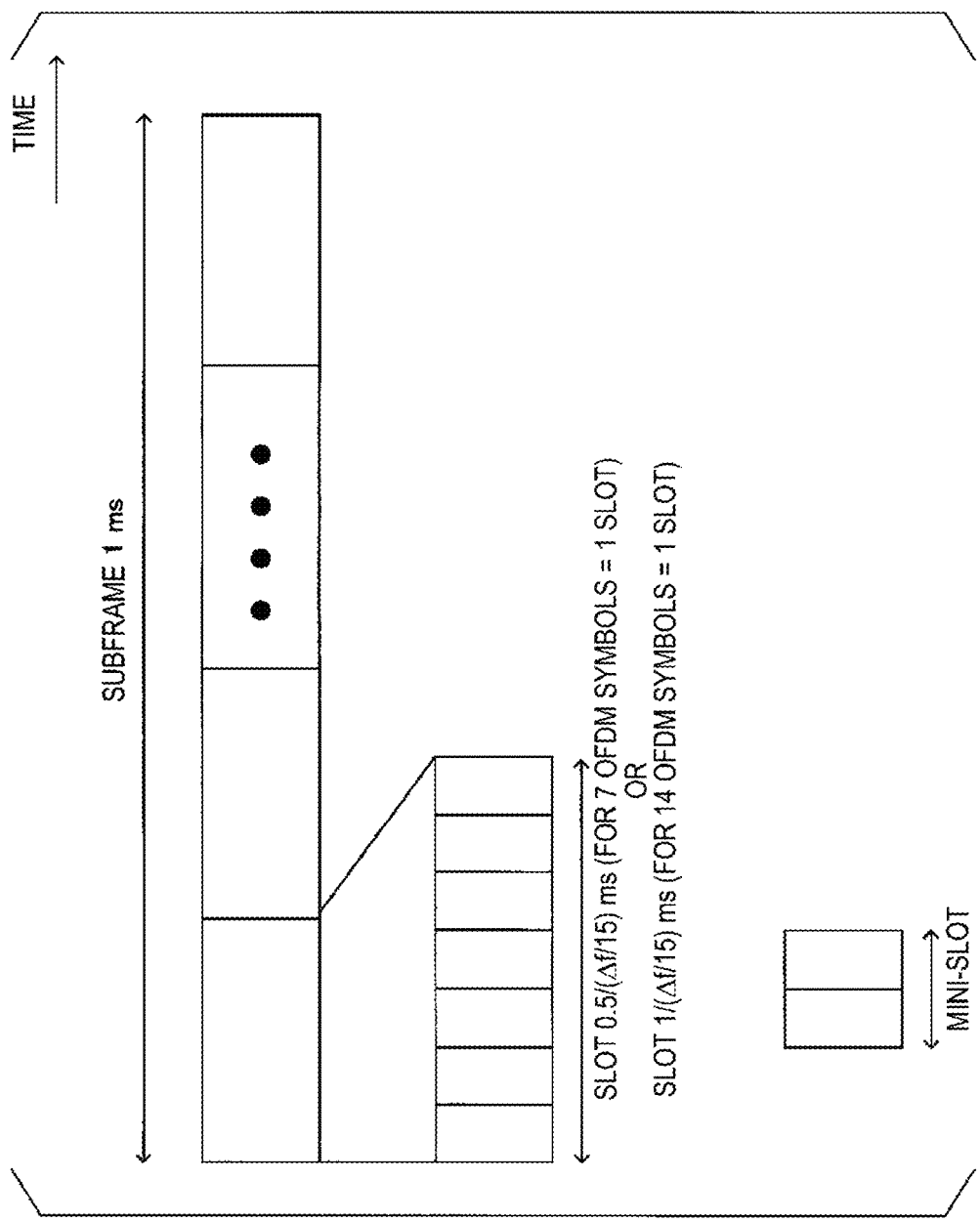
FIG. 3 is a diagram illustrating a relationship between a subframe, a slot, and a mini-slot in a time domain according to the embodiment of the present invention.

Next, the subframe, the slot, and the mini-slot will be described. FIG. 3 is a diagram illustrating a relationship between the subframe, the slot, and the mini-slot in the time domain. As illustrated in the drawing, three time units are defined. The subframe is 1 ms regardless of the subcarrier spacing, the number of OFDM symbols included in the slot is 7 or 14, and a slot length depends on the subcarrier spacing. Here, in a case that the subcarrier spacing is 15 kHz, 14 OFDM symbols are included in one subframe. Thus, in a case that the subcarrier spacing is 4f (kHz), the slot length may be defined as $0.5/(\Delta f/15)$ ms in a case that the number of OFDM symbols constituting one slot is 7. Here, $\Delta f$ may be defined by the subcarrier spacing (kHz). In the case that the number of OFDM symbols constituting one slot is 7, the slot length may be defined as $1/(\Delta f/15)$ ms. Here, $\Delta f$ may be defined by the subcarrier spacing (kHz). Furthermore, in a case that the number of OFDM symbols included in the slot is X, the slot length may be defined as $X/14/(\Delta f/15)$ ms.

The mini-slot (which may be referred to as a sub-slot) is a time unit including the OFDM symbols that are less than the number of OFDM symbols included in the slot. The drawing illustrates a case that the mini-slot includes two OFDM symbols as an example. The OFDM symbol in the mini-slot may match an OFDM symbol timing that constitutes the slot. Note that a minimum unit of scheduling may be a slot or a mini-slot.

Figure 4:
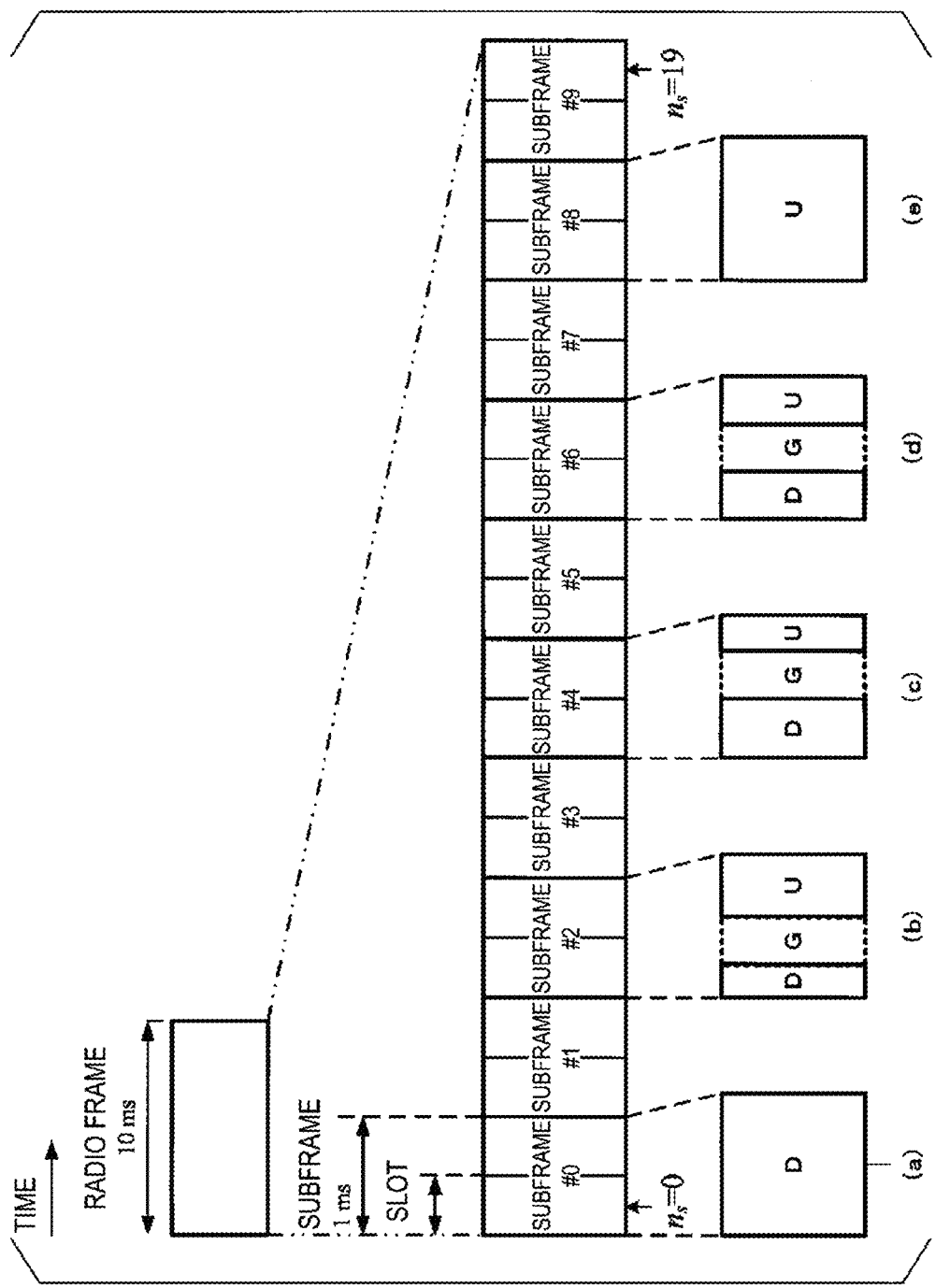
FIG. 4 is a diagram illustrating an example of a slot or a subframe according to the embodiment of the present invention.

FIG. 4 illustrates an example of a slot or a subframe. Here, a case that the slot length is 0.5 ms in the subcarrier spacing 15 kHz is illustrated as an example. In the drawing, D represents the downlink, and U represents the uplink. As illustrated in the drawing, during a certain time period (for example, the minimum time period to be allocated to one UE in the system), one or more of the followings may be included:

a downlink part (duration),
a gap, and
a uplink part (duration).

(a) of FIG. 4 is an example in which in a certain time period (which may be referred to as, for example, a minimum unit of time resource that can be allocated to one UE, a time unit, or the like, or multiple minimum units of time resource may be bundled and referred to as a time unit) is entirely used for downlink transmission. (b) of FIG. 4 illustrates an example in which an uplink is scheduled via a PCCH, for example, by using the first time resource, through a gap for a processing delay of the PCCH, a time for switching from a downlink to an uplink, and generation of a transmit signal, and then, an uplink signal is transmitted. (c) of FIG. 4 illustrates an example in which a downlink PCCH and/or downlink PSCH are transmitted by using the first time resource, and a PSCH or PCCH is transmitted through a gap for a processing delay, a time for switching from a downlink to an uplink, and generation of a transmit signal. Here, as an example, the uplink signal may be used to transmit the HARQ-ACK and/or CSI, namely, the UCI. (d) of FIG. 4 illustrates an example in which a downlink PCCH and/or downlink PSCH are transmitted by using the first time resource, and an uplink PSCH or PCCH is transmitted through a gap for a processing delay, a time for switching from a downlink to an uplink, and generation of a transmit signal. Here, as an example, the uplink signal may be used to transmit the uplink data, namely, the UL-SCH. (e) of FIG. 4 illustrates an example in which the entire subframe is used for uplink transmission (uplink PSCH or PCCH).

The above-described downlink part and uplink part may include multiple OFDM symbols as is the case in LTE.

The beamforming, the beam management and/or the beam sweeping according to the embodiment of the present invention will be described.

The beamforming on the transmission side (that is the base station apparatus 3 in a case of the downlink, or the terminal apparatus 1 in a case of the uplink) is a method of controlling, in an analogue or digital manner, an amplitude/phase of a signal for each of multiple transmit antenna elements to transmit the signal with a high transmit antenna gain in any direction, and a field pattern thereof is referred to as a transmission beam. The beamforming on the reception side (that is the terminal apparatus 1 in a case of the downlink, or the base station apparatus 3 in a case of the uplink) is a method of controlling, in an analogue or digital manner, an amplitude/phase of a signal for each of multiple receive antenna elements to receive the signal with a high receive antenna gain in any direction, and a field pattern thereof is referred to as a reception beam. The beam management may be directivity alignment of the transmission and/or reception beams, and operations of the base station apparatus 3 and/or the terminal apparatus 1 for acquiring a beam gain.

Figure 5:
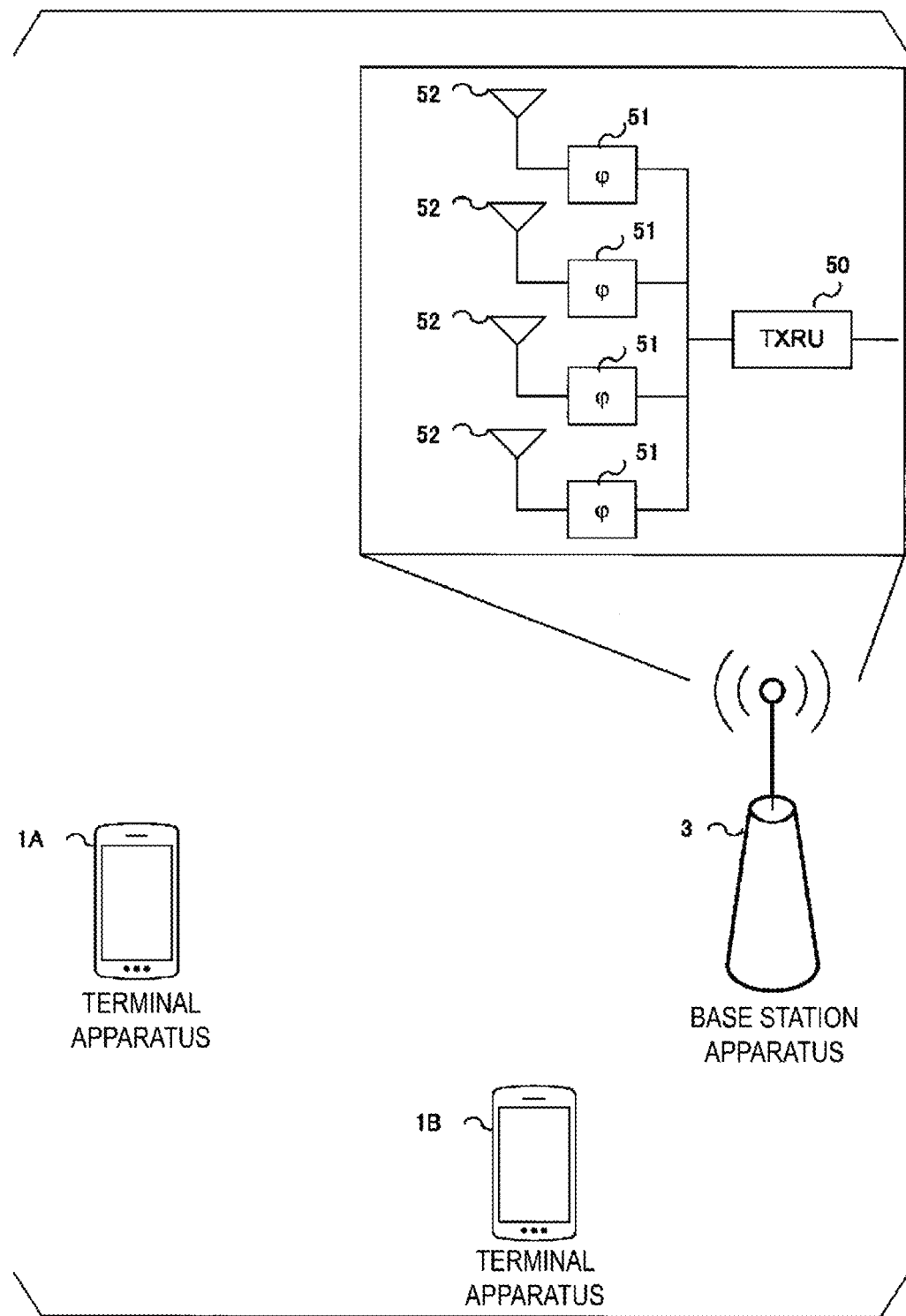
FIG. 5 is a diagram illustrating an example of beamforming according to the embodiment of the present invention.

FIG. 5 illustrates an example of the beamforming. Multiple antenna elements are connected to one Transceiver unit (TXRU) 50, and can control phases by phase shifters 51 of the respective antenna elements and transmit from the antenna elements 52 to direct a beam for the transmit signals in any direction. Typically, the TXRU 50 may be defined as an antenna port, and only an antenna port may be defined in the terminal apparatus 1. By controlling the phase shifters 51, the base station apparatus 3 can direct the directivity in any direction, and thus, the base station apparatus 3 can communicate using a beam having a high gain with respect to the terminal apparatus 1.

The beamforming may be referred to as virtualization, precoding, and multiplication with a weight, for example. A signal transmitted through beamforming may be simply referred to as a transmission beam.

In the present embodiment, a transmission beam used by the terminal apparatus 1 in beamforming for uplink transmission is referred to as an uplink transmission beam (UL Tx beam), and a reception beam used by the base station apparatus 3 in beamforming for uplink reception is referred to as an uplink reception beam (UL Rx beam). A transmission beam used by the base station apparatus 3 in beamforming for downlink transmission is referred to as a downlink transmission beam (DL Tx beam), and a reception beam used by the terminal apparatus 1 in beamforming for downlink reception is referred to as a downlink reception beam (DL Rx beam). Note that the uplink transmission beam and the uplink reception beam may be collectively referred to as an uplink beam, and the downlink transmission beam and the downlink reception beam may be collectively referred to as a downlink beam. Note that a process performed by the terminal apparatus 1 for the uplink beamforming may be referred to as uplink transmission beam processing or uplink precoding, and a process performed by the base station apparatus 3 for the uplink beamforming may be referred to as uplink reception beam processing. Note that a process performed by the terminal apparatus 1 for the downlink beamforming may be referred to as downlink reception beam processing, and a process performed by the base station apparatus 3 for the downlink beamforming may be referred to as downlink transmission beam processing or downlink precoding.

Note that the base station apparatus 3 may transmit the signal using multiple downlink transmission beams in one OFDM symbol. For example, the antenna elements of the base station apparatus 3 may be divided into subarrays to perform beamforming differently for each of the subarrays. Downlink beamforming may be performed differently for each polarization using a polarization antenna. Similarly, the terminal apparatus 1 may transmit a signal by using multiple uplink transmission beams in one OFDM symbol.

Note that in the present embodiment, a case is described in which the base station apparatus 3 switches and uses multiple downlink transmission beams in a cell constituted by the base station apparatus 3 and/or the transmission reception point 4, but a cell may be constituted individually for each downlink transmission beam.

The beam management may include the following operations.

Beam selection

Beam refinement

Beam recovery

For example, the beam selection may be an operation to select a beam in a communication between the base station apparatus 3 and the terminal apparatus 1. The beam refinement may be an operation to select a beam having a further higher gain or change a beam between an optimal base station apparatus 3 and the terminal apparatus 1 due to movement of the terminal apparatus 1. The beam recovery may be an operation to re-select a beam in a case that a quality of the communication link decreases due to a blockage generated by an obstacle, a human passing, or the like in a communication between the base station apparatus 3 and the terminal apparatus 1. The above operations are not limited to the above purposes. The base station apparatus 3 may perform the beam management in a variety of contexts and, therefore, can exert an effect without limiting the purpose.

For example, a reference signal (for example, CSI-RS) may be used in selecting a transmission beam of the base station apparatus 3 in the terminal apparatus 1, or a Quasi Co-Location (QCL) assumption may be used.

In a case that a Long Term Property of a channel on which a symbol is carried at an antenna port can be estimated from a channel on which a symbol is carried at another antenna port, the two antenna ports are said to be in QCL. The long term property of the channel includes one or more of a delay spread, a Doppler spread, a Doppler shift, an average gain, and an average delay. For example, in a case that antenna port 1 and antenna port 2 are in QCL for an average delay, it means that a reception timing of antenna port 2 may be inferred from a reception timing of antenna port 1.

The QCL may also be expanded to the beam management. Therefore, a spatially expanded QCL may be newly defined. For example, one or more of the following may be further included in addition to the above as the Long term property of the channel in the QCL assumption for the space.

Arrival angle in a radio link or a channel (such as Angle of Arrival (AoA) and Zenith angle of Arrival (ZoA)) and/or its Angle Spread (such as Angle Spread of Arrival (ASA) and Zenith angle Spread of Arrival (ZSA)), Departure angle in a radio link or a channel (such as AoD and ZoD) and/or its Angle Spread (such as Angle Spread of Departure (ASD) and Zenith angle Spread of Departure (ZSS)), and Spatial Correlation.

According to this method, as the beam management, the operation of the base station apparatus 3 and the terminal apparatus 1 equivalent to the beam management may be defined by the QCL assumption of the space and the radio resource (time and/or frequency).

Note that an antenna port may be assigned to each of the precoding or the transmission beams. For example, a signal to be transmitted by using a different precoding or a signal to be transmitted by using a different transmission beam according to the present embodiment may be defined as a signal to be transmitted through one or more different antenna ports. Note that the antenna port is defined as an antenna port that allows a channel on which a certain symbol is transmitted through a certain antenna port to be inferred from a channel on which another symbol is transmitted through the same antenna port. The same antenna port also means that the antenna port number (the number for identifying an antenna port) may be the same. An antenna port set may be constituted by multiple antenna ports. The same antenna port set also means that the antenna port set number (the number for identifying an antenna port set) may be the same. A signal to be transmitted by applying a different terminal transmission beam also means that the signal may be transmitted through a different antenna port or a different antenna port set constituted by multiple antenna ports. A beam index may be an OFDM symbol number, an antenna port number, or an antenna port set number.

A complex modulation symbol for one or more layers generated by layer mapping is input into transform precoding. The transform precoding may be a process for dividing a block of complex-valued symbols into sets for each layer corresponding to one OFDM symbol. In a case that the OFDM is used, a process of Discrete Fourier Transform (DFT) in the transform precoding may not be necessary. In the precoding, the block of vectors obtained from a transform precoder may be input to generate a block of vectors to be mapped to a resource element. In a case of spatial multiplexing, one of precoding matrices may be adapted in generating the block of vectors to be mapped to a resource element. This process may be referred to as digital beamforming. Further, the precoding may be defined to include analog beamforming and digital beamforming, or may be defined as digital beamforming. The beamforming may be applied to a precoded signal, and the precoding may be applied to a signal to which the beamforming is applied. The beamforming may include digital beamforming and may not include analog beamforming, or may include both digital beamforming and analog beamforming. A beamformed signal, a precoded signal, or a beamformed and precoded signal may be referred to as a beam. An index of a beam may be a precoding matrix index. The beam index and the precoding matrix index may be defined independently. The precoding matrix indicated by the precoding matrix index may be applied to the beam indicated by the beam index to generate a signal. The beamforming indicated by the beam index may be applied to the signal to which the precoding matrix indicated by the precoding matrix index is applied, to generate a signal. The digital beamforming may include different precoding matrix adaptation to a resource in a frequency direction (for example, a set of subcarriers).

Note that, in the present embodiment, a radio link constituted by using a prescribed transmission beam and/or a prescribed reception beam may be referred to as a beam pair link. For example, in the downlink, a beam pair link constituted by using different downlink transmission beams and/or different downlink reception beams may be a different downlink beam pair link. For example, in the uplink, a beam pair link constituted by using different uplink transmission beams and/or different uplink reception beams may be a different uplink beam pair link. For example, a state in which the terminal apparatus 1 may receive downlink signals by using multiple downlink transmission beams and/or multiple downlink reception beams in a certain cell may be referred to as a state having multiple downlink beam pair links. For example, a state in which the terminal apparatus 1 may transmit the uplink signals by using multiple uplink transmission beams and/or multiple uplink reception beams in a certain cell may be referred to as a state having multiple uplink beam pair links.

A concept of the downlink beam pair link according to the present embodiment will be described.

Figure 6:
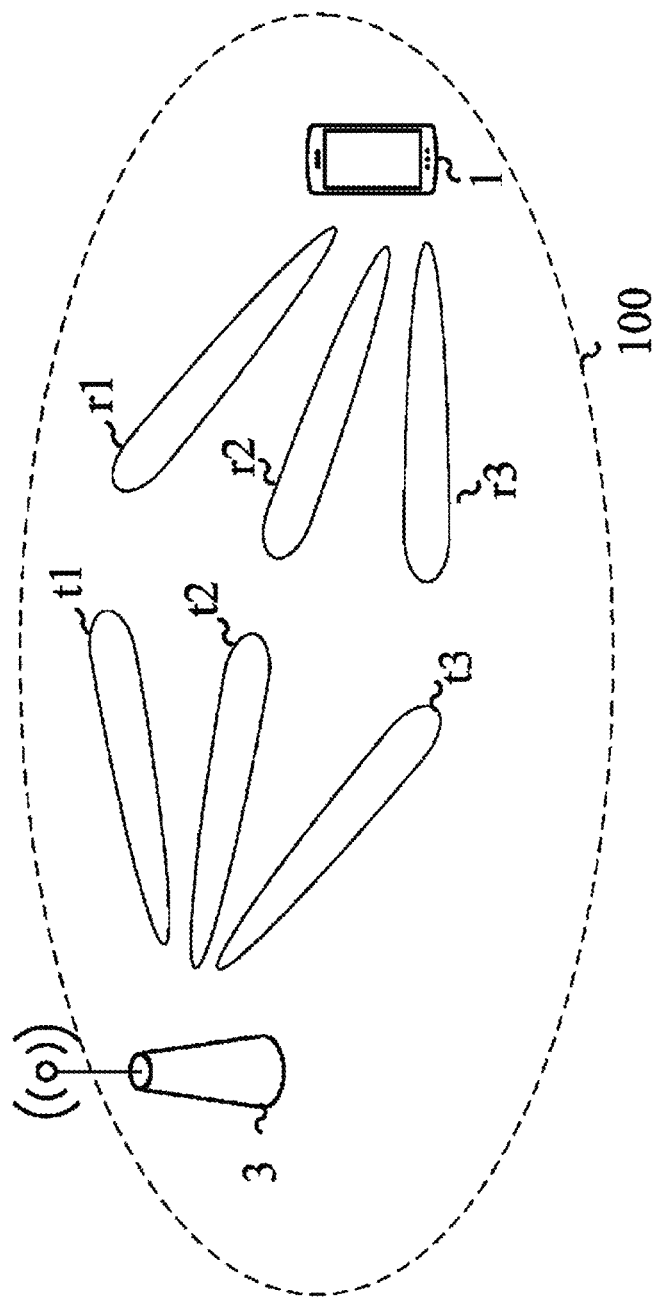
FIG. 6 is a diagram illustrating a concept in which multiple reference signals applied to a transmission beam are transmitted in one or more cells according to the embodiment of the present invention.

FIG. 6 illustrates a case where the terminal apparatus 1 and the base station apparatus 3 form multiple downlink beam pair links in the cell 100. As a first downlink beam pair link, a downlink signal transmitted by the base station apparatus 3 by using a downlink transmission beam t1 is received by the terminal apparatus 1 by using a downlink reception beam r1. As a second downlink beam pair link, a downlink signal transmitted by the base station apparatus 3 by using a downlink transmission beam t2 is received by the terminal apparatus 1 by using a downlink reception beam r2. As a third downlink beam pair link, a downlink signal transmitted by the base station apparatus 3 by using a downlink transmission beam t3 is received by the terminal apparatus 1 by using a downlink reception beam r3. In this case, three downlink beam pair links are formed between the terminal apparatus 1 and the base station apparatus 3, and downlink transmission and/or reception is performed in all or some of three downlink beam pair links. For example, the terminal apparatus 1 measures a received power and/or a reception quality by way of a reference signal in each downlink beam pair link.

Note that multiple downlink beam pair links may be formed for one downlink transmission beam by using multiple downlink reception beams. Note that multiple downlink beam pair links may be formed for one downlink reception beam by using multiple downlink transmission beams. Note also that regardless of the downlink reception beam to be used, one downlink beam pair link may be associated with one downlink transmission beam. In addition, note that regardless of the uplink transmission beam to be used, one uplink beam pair link may be associated with one uplink reception beam.

A concept of a downlink radio link (which may be simply referred to as a radio link) in the present embodiment will be described.

In the present embodiment, only one downlink radio link may be formed for each serving cell. The downlink radio link may refer to a downlink radio link associated with a serving cell independently of a downlink beam pair link associated with the beam. Note that the downlink radio link may be one of multiple downlink beam pair links formed for a certain terminal apparatus 1 in the serving cell. Note that the downlink radio link may be associated with two or more of multiple downlink beam pair links formed for the certain terminal apparatus 1 in the serving cell. For example, the terminal apparatus 1 may measure multiple received powers and/or reception qualities by way of multiple reference signals in one downlink radio link.

Monitoring of the NR-PDCCH according to the present embodiment will be described.

Figure 7:
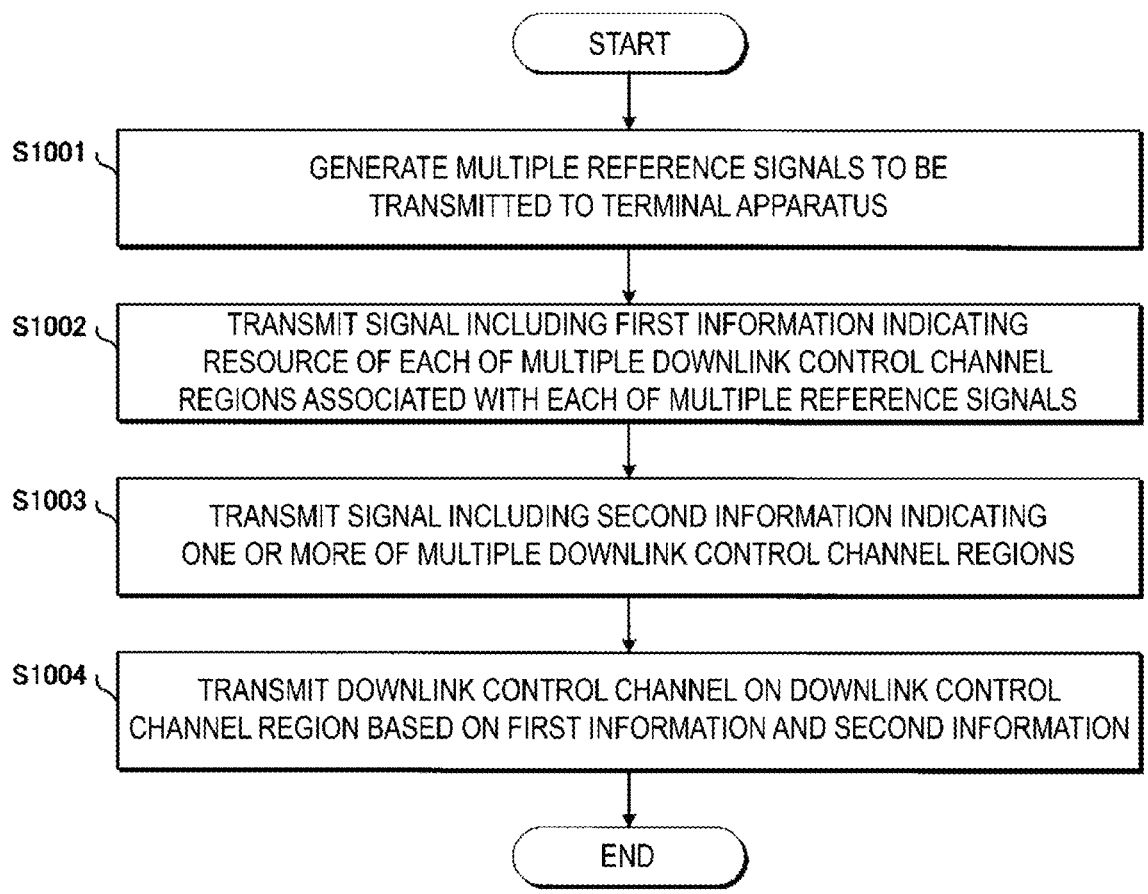
FIG. 7 is a flowchart illustrating an example of triggering a beam pair link status reporting in a terminal apparatus 1 according to the embodiment of the present invention.

FIG. 7 is a flowchart illustrating an example of transmitting a downlink control channel in the base station apparatus 3 according to the present embodiment. The base station apparatus 3 generates multiple reference signals to be transmitted to the terminal apparatus (S1001). The base station apparatus 3 transmits a signal including first information indicating a resource of each of multiple downlink control channel regions (which may be referred to as search space, for example) associated with each of the multiple reference signals (S1002). Note that the signal including the first information may be an RRC message. The base station apparatus 3 transmits a signal including second information indicating one or more of the multiple downlink control channel regions (S1003). Note that the signal including the second information may be a MAC CE. The base station apparatus 3 transmits the downlink control channel on the resource of the downlink control channel region based on the first information and the second information (S1004).

Figure 8:
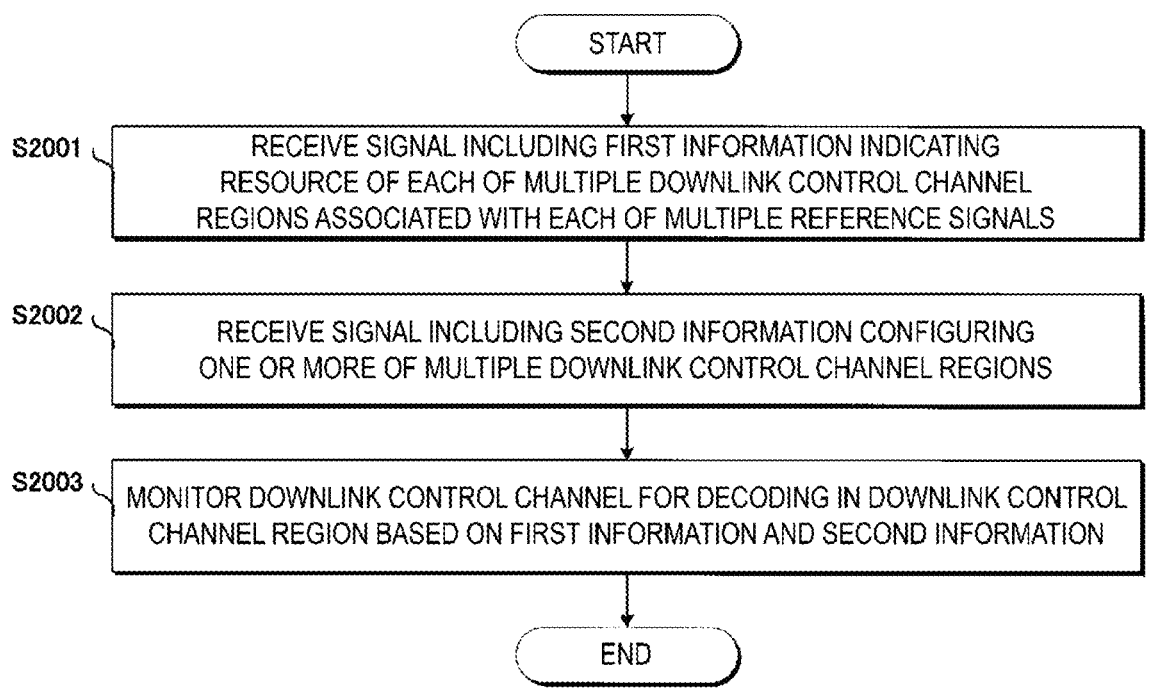
FIG. 8 is a flowchart illustrating an example of triggering a beam recovery request in the terminal apparatus 1 according to the embodiment of the present invention.

FIG. 8 is a flowchart illustrating an example of monitoring a downlink control channel in the terminal apparatus 1 according to the present embodiment. The terminal apparatus 1 receives a signal including first information indicating a resource of each of multiple downlink control channel regions (which may be referred to as search space, for example) associated with each of the multiple reference signals (S2001). The terminal apparatus 1 receives a signal including second information configuring one or more of the multiple downlink control channel regions (S2002). The terminal apparatus 1 monitors the downlink control channel for decoding on a resource in the downlink control channel region based on the first information and the second information (S2003).

Note that an RRC layer for the base station apparatus 3 may transmit, to the terminal apparatus 1, an RRC message including an index indicating a parameter configuring one or more search space candidates and each of one or more search space candidates. Note that the terminal apparatus 1 may receive, from an RRC layer for the base station apparatus 3, an RRC message including an index indicating a parameter configuring one or more search space candidates and each of one or more search space candidates. Each search space candidate may be configured with parameters such as time, frequency, and/or QCL. Each search space candidate may be associated with one or more reference signals (for example, non-zero power CSI-RS, or the like), based on information such as QCL. Note that each search space candidate may be configured with parameters such as time, frequency, and/or QCL. Each search space candidate may be associated with one or more reference signals (for example, non-zero power CSI-RS, or the like), based on information such as QCL. Note that each search space candidate may associated with each beam pair link. The terminal apparatus 1 that has received the RRC message for configuring one or more search space candidates may activate one or more search spaces to monitor the NR-PDCCH in response to receiving the information for identifying one or more search spaces to monitor the NR-PDCCH.

Note that the MAC layer for the base station apparatus 3 may determine one or more search spaces for the terminal apparatus 1 to monitor the NR-PDCCH, and may notify the terminal apparatus 1 of the information for identifying one or more search spaces to monitor the NR-PDCCH. Note that the MAC entity for the terminal apparatus 1 may receive the information for identifying search spaces of one or more NR-PDCCHs for the terminal apparatus 1 to monitor, from the MAC layer of the base station apparatus 3. The information for identifying search spaces of one or more NR-PDCCHs to monitor may be transmitted in the MAC control element. The terminal apparatus 1 may activate one or more NR-PDCCH search spaces to be monitored in response to receiving the information for identifying search spaces of one or more NR-PDCCHs to monitor.

Note that one or more search spaces for the terminal apparatus 1 to monitor the NR-PDCCH may be indicated by bit map information in which a bit is associated with each of indices of the multiple search space candidates notified by the RRC layer for the base station apparatus 3. This bitmap information may cause the terminal apparatus 1 to monitor the activated search space.

Beam pair link monitoring by the terminal apparatus 1 will be described below. Hereinafter, a description is made referring a downlink beam pair link simply as a beam pair link, and a similar method may be applied to an uplink beam pair link.

The terminal apparatus 1 according to the present embodiment monitors a quality of one or more beam pair links (which may be referred to as a beam pair link quality or a downlink beam pair link quality, for example). Note that one or more beam pair links of which the quality the terminal apparatus 1 monitors may be beam pair links on which the terminal apparatus 1 monitors the NR-PDCCH transmitted from the base station apparatus 3. Note that the terminal apparatus 1 may monitor one or more beam pair links in the primary cell, one or more beam pair links in the primary secondary cell, and/or one or more beam pair links in the secondary cell. Note that one or more beam pair links of which the quality the terminal apparatus 1 monitors may be indicated by the terminal apparatus 1 from the base station apparatus 3 base station apparatus 3 by using the MAC CE, the RRC, and/or the DCI. The terminal apparatus 1 may monitor one or more beam pair links corresponding to the respective search spaces, based on that one or more search spaces to monitor the NR-PDCCH are configured (or activated).

The terminal apparatus 1 monitors, in order to detect a beam pair link quality of a beam pair link, the beam pair link quality, based on reference signals corresponding to the beam pair link.

Note that the reference signal for monitoring a beam pair link quality of a beam pair link may be a reference signal for decoding the NR-PDCCH corresponding to that beam pair link.

Note that the reference signal for monitoring a beam pair link quality of a beam pair link may be CSI-RS (for example, non-zero power CSI-RS, or the like) associated with the beam pair link. For example, the CSI-RS for monitoring a beam pair link quality of a beam pair link may be a CSI-RS to which a transmission beam corresponding to the beam pair link is applied.

The terminal apparatus 1 evaluates a certain beam pair link quality at a prescribed timing (for example, every radio frame) over the previous time period.

Note that the beam pair link quality of the certain beam pair link evaluated by the terminal apparatus 1 may be a value in a case of using the reception beam having the highest quality among one or more reception beams which the terminal apparatus 1 can apply to a downlink transmission beam used by the base station apparatus 3 in the corresponding beam pair link.

The terminal apparatus 1 may compare one evaluated beam pair link quality to one or more thresholds to perform assessment. Such one or more thresholds may be included in the parameters configuring the corresponding search space candidate.

The physical layer for the terminal apparatus 1 may determine that the monitored beam pair link is "beam out-of-sync" in a case that the beam pair link quality over the previous time period is worse than a threshold value $Q_1$. The physical layer for the terminal apparatus 1 may send an indication of "beam out-of-sync" of the monitored beam pair link to the higher layer, in the case that the beam pair link quality over the previous time period is worse than the threshold value $Q_1$.

The physical layer for the terminal apparatus 1 may change the reception beam of the monitored beam pair link in the case that the beam pair link quality over the previous time period is worse than the threshold value $Q_1$. The physical layer for the terminal apparatus 1 may determine that the monitored beam pair link is "beam out-of-sync" in a case that the beam pair link quality over the previous time period is worse than the threshold value $Q_1$ even in a case that the terminal apparatus 1 uses any of one or more reception beams which the terminal apparatus 1 can apply. The physical layer for the terminal apparatus 1 may send an indication of "beam out-of-sync" of the monitored beam pair link to the higher layer in the case that the beam pair link quality over the previous time period is worse than the threshold value $Q_1$ even in a case that the terminal apparatus 1 uses any of one or more reception beams which the terminal apparatus 1 can apply.

The physical layer for the terminal apparatus 1 may determine that the monitored beam pair link is "beam in-sync" in a case that the beam pair link quality over the previous time period is better than a threshold value $Q_2$. The physical layer for the terminal apparatus 1 may send an indication "beam in-sync" of the monitored beam pair link to the higher layer, in a case that the beam pair link quality over the previous time period is better than the threshold value $Q_2$.

The terminal apparatus 1 may compare multiple evaluated beam pair link qualities to one or more thresholds to perform assessment. Such one or more thresholds may be included in the parameters configuring the corresponding search space candidate.

The physical layer for the terminal apparatus 1 may determine "beam out-of-sync" in a case that a prescribed number of beam pair links among the multiple beam pair links are worse than the threshold value $Q_1$ over the previous time period. The physical layer for the terminal apparatus 1 may send an indication "beam out-of-sync" to the higher layer in the case that a prescribed number of beam pair links among the multiple beam pair links are worse than the threshold value $Q_1$ over the previous time period.

The physical layer for the terminal apparatus 1 may determine "beam in-sync" in a case that a prescribed number of beam pair links among the multiple beam pair links are better than the threshold value $Q_2$ over the previous time period. The physical layer for the terminal apparatus 1 may send an indication of "beam in-sync" to the higher layer in the case that a prescribed number of beam pair links among the multiple beam pair links are better than the threshold value $Q_2$ over the previous time period.

Note that the threshold $Q_1$ may be a value indicating a level at which an NR-PDCCH transmission cannot be securely received (for example, the NR-PDCCH cannot be received at block error rate of 10% or less). Note that the threshold $Q_2$ may be a value indicating a level at which an NR-PDCCH transmission can be sufficiently securely received (for example, the NR-PDCCH can be received at block error rate of 2% or less).

Note that the physical layer for the terminal apparatus 1 may send values for the beam pair links over the previous time period to the higher layer. Note that the value for the beam pair link quality over the past period may be the received power of the reference signal received in the corresponding beam pair link (referred to as Reference Signal Received Power (RSRP), L1-RSRP, and the like).

Hereinafter, an operation related to a Beam Pair Link Failure (BPLF) by the terminal apparatus 1 will be described.

The RRC layer for the terminal apparatus 1 according to the present embodiment may perform operations as described below.

In a case that the RRC layer for the terminal apparatus 1 receives $N_1$ continuous indications "beam out-of-sync" from the lower layer, the RRC layer may consider that a beam pair link failure has been detected in one or more beam pair links for monitoring the NR-PDCCH (which may be referred to as NR-PDCCH monitoring set).

In a case that, among one or more beam pair links for monitoring the NR-PDCCH, the number of beam pair links for which $N_1$ or more continuous indications "beam out-of-sync" have been received from the lower layer is equal to or more than a certain number at a certain timing, the RRC layer for the terminal apparatus 1 may consider that a beam pair link failure has been detected in one or more beam pair links for monitoring the NR-PDCCH.

In a case that the RRC layer for the terminal apparatus 1 receives $N_1$ continuous indications "beam out-of-sync" from the lower layer, the RRC layer may start a first timer. In a case that the RRC layer for the terminal apparatus 1 receives $N_2$ continuous indications "beam in-sync" from the lower layer, the RRC layer may stop the first timer.

In a case that, among one or more beam pair links for monitoring the NR-PDCCH, the number of beam pair links for which $N_1$ or more continuous indications "beam out-of-sync" have been received from the lower layer is equal to or more than a certain number at a certain timing, the RRC layer for the terminal apparatus 1 may start the first timer. In a case that, among one or more beam pair links for monitoring the NR-PDCCH, the number of beam pair links for which $N_2$ or more continuous indications "beam in-sync" have been received from the lower layer is equal to or more than a certain number at a certain timing, the RRC layer for the terminal apparatus 1 may stop the first timer.

In a case that the first timer expires (expiry), the RRC layer for the terminal apparatus 1 may consider that a beam pair link failure is detected in one or more beam pair links for monitoring the NR-PDCCH (which may be referred to as NR-PDCCH monitoring set).

In a case that the RRC layer for the terminal apparatus 1 receives $N_3$ or more continuous indications "beam out-of-sync" from the lower layer at a certain timing for all of one or more beam pair links for monitoring the NR-PDCCH, the RRC layer may start a second timer. In a case that, among one or more beam pair links for monitoring the NR-PDCCH, the number of beam pair links for which $N_4$ or more continuous indications "beam in-sync" have been received from the lower layer is equal to or more than a certain number at a certain timing, the RRC layer for the terminal apparatus 1 may start the second timer. In a case that the second timer expires (expiry), the RRC layer for the terminal apparatus 1 may consider that a radio link failure has been detected in one or more beam pair links for monitoring the NR-PDCCH.

The MAC layer for the terminal apparatus 1 according to the present embodiment may perform operations as described below.

In a case that the MAC layer for the terminal apparatus 1 receives $N_1$ continuous indications "beam out-of-sync" from the lower layer, the MAC layer may consider that a beam pair link failure has been detected in one or more beam pair links for monitoring the NR-PDCCH (which may be referred to as NR-PDCCH monitoring set). In a case that the MAC layer for the terminal apparatus 1 receives $N_1$ continuous indications "beam out-of-sync" from the lower layer, the MAC layer may generate a MAC CE for beam recovery.

In a case that, among one or more beam pair links for monitoring the NR-PDCCH, the number of beam pair links for which $N_1$ or more continuous indications "beam out-of-sync" have been received from the lower layer is equal to or more than a certain number at a certain timing, the MAC layer for the terminal apparatus 1 may consider that a beam pair link failure has been detected in one or more beam pair links for monitoring the NR-PDCCH. In a case that, among one or more beam pair links for monitoring the NR-PDCCH, the number of beam pair links for which $N_1$ or more continuous indications "beam out-of-sync" have been received from the lower layer is equal to or more than a certain number at a certain timing, the MAC layer for the terminal apparatus 1 may generate a MAC CE for beam recovery.

In a case that the MAC layer for the terminal apparatus 1 receives $N_1$ continuous indications "beam out-of-sync" from the lower layer, the MAC layer may start a first timer. In a case that the MAC layer for the terminal apparatus 1 receives $N_2$ continuous indications "beam in-sync" from the lower layer, the MAC layer may stop the first timer.

In a case that, among one or more beam pair links for monitoring the NR-PDCCH, the number of beam pair links for which $N_1$ or more continuous indications "beam out-of-sync" have been received from the lower layer is equal to or more than a certain number at a certain timing, the MAC layer for the terminal apparatus 1 may start the first timer. In a case that, among one or more beam pair links for monitoring the NR-PDCCH, the number of beam pair links for which $N_2$ continuous indications "beam in-sync" have been received from the lower layer is equal to or more than a certain number at a certain timing, the MAC layer for the terminal apparatus 1 may stop the first timer.

In a case that the first timer expires (expiry), the MAC layer for the terminal apparatus 1 may consider that a beam pair link failure is detected in one or more beam pair links for monitoring the NR-PDCCH (which may be referred to as NR-PDCCH monitoring set). In the case that the first timer expires (expiry), the MAC layer for the terminal apparatus 1 may generate a MAC CE for beam recovery.

The MAC layer for the terminal apparatus 1 receives a value for a beam pair link quality over the previous time period corresponding to each of one or more beam pair links, and in a case that the values for the beam pair link qualities of a certain number or more of beam pair links are worse than a threshold value $Q_3$ at a certain timing, the MAC layer may determine "beam out-of-sync". The MAC layer for the terminal apparatus 1 receives a value for a beam pair link quality over the previous time period corresponding to each of one or more beam pair links, and in a case that the values for the beam pair link qualities of a certain number or more of beam pair links are better than a threshold value $Q4$ at a certain timing, the MAC layer may determine "beam in-sync". The MAC layer for the terminal apparatus 1 receives a value for a beam pair link quality over the previous time period corresponding to each of one or more beam pair links, and in a case that the values for the beam pair link qualities of a certain number or more of beam pair links are worse than a threshold value $Q_3$ at a certain timing or multiple continuous timings, the MAC layer may start a first timer. The MAC layer for the terminal apparatus 1 receives a value for a beam pair link quality over the previous time period corresponding to each of one or more beam pair links, and in a case that the values for the beam pair link qualities of a certain number or more of beam pair links are better than a threshold value $Q4$ at a certain timing or multiple continuous timings, the MAC layer may stop the first timer. The MAC layer for the terminal apparatus 1 receives a value for a beam pair link quality over the previous time period corresponding to each of one or more beam pair links, and in a case that the values for the beam pair link qualities of a certain number or more of beam pair links are worse than a threshold value $Q_3$ at a certain timing or multiple continuous timings, the MAC layer generate a MAC CE for beam recovery. Such one or more thresholds may be included in the parameters configuring the corresponding search space candidate.

Note that the MAC layer for the terminal apparatus 1 may perform a filtering process on the value for the beam pair link quality received from the lower layer. In a case that, among the filtering-processed values (also referred to as L2-filtered-RSRP) for the beam pair link qualities corresponding to one or more beam pair links, a certain number or more of values are worse than a threshold $Q_5$ at a certain timing, the MAC layer for the terminal apparatus 1 may determine "beam out-of-sync". In a case that, among the filtering-processed values for the beam pair link qualities corresponding to one or more beam pair links, a certain number or more of values are better than a threshold $Q_6$ at a certain timing, the MAC layer for the terminal apparatus 1 may determine "beam in-sync". In a case that, among the filtering-processed values for the beam pair link qualities corresponding to one or more beam pair links, a certain number or more of values are worse than the threshold $Q_5$ at a certain timing or multiple continuous timings, the MAC layer for the terminal apparatus 1 may start a first timer. In a case that, among the filtering-processed values for the beam pair link qualities corresponding to one or more beam pair links, a certain number or more of values are better than the threshold $Q_6$ at a certain timing or multiple continuous timings, the MAC layer for the terminal apparatus 1 may stop a first timer. In a case that, among the filtering-processed values for the beam pair link qualities corresponding to one or more beam pair links, a certain number or more of values are worse than the threshold $Q_5$ at a certain timing or multiple continuous timings, the MAC layer for the terminal apparatus 1 may generate a MAC CE for beam recovery. Such one or more thresholds may be included in the parameters configuring the corresponding search space candidate.

The terminal apparatus 1 according to the present embodiment may trigger a beam pair link status reporting to the base station apparatus 3 in a case of a prescribed condition in the MAC layer and/or the RRC layer (for example, in a case that a beam pair link failure is detected).

Figure 9:
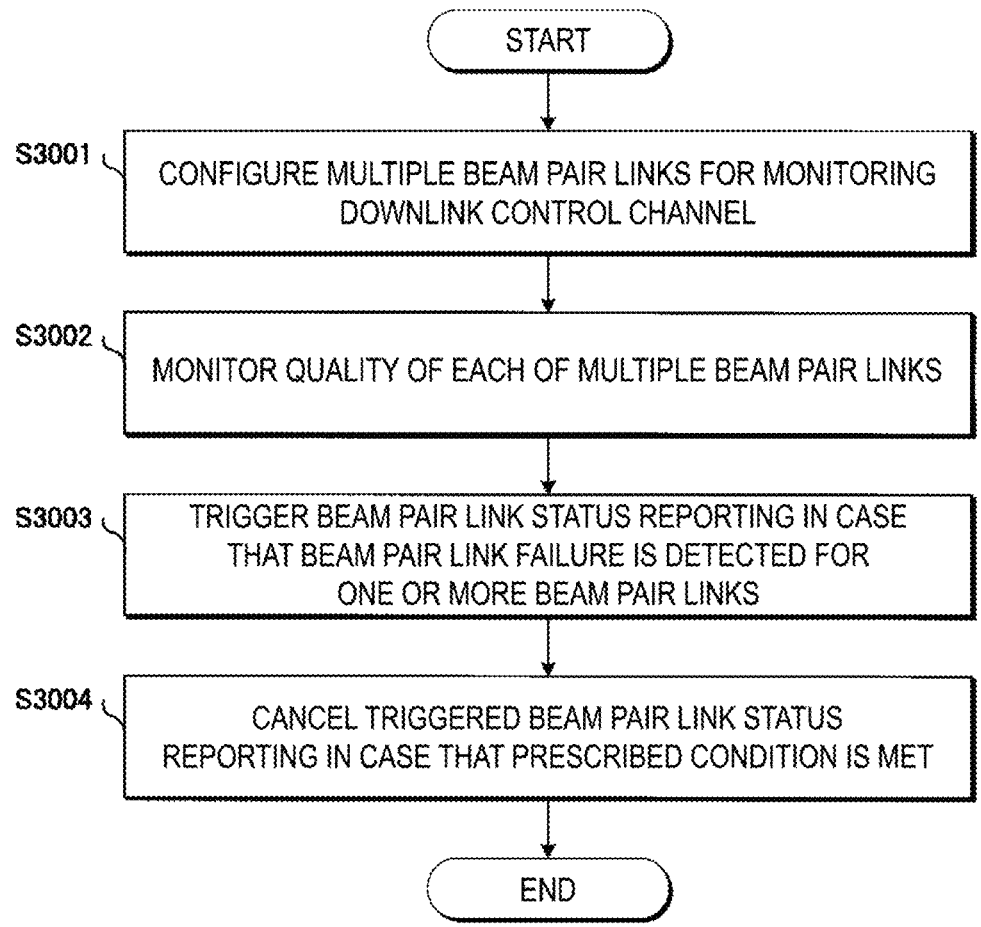
FIG. 9 is a flowchart illustrating an example of monitoring a downlink control channel in the terminal apparatus 1 according to the embodiment of the present invention.

FIG. 9 is a flowchart illustrating an example of triggering the beam pair link status reporting in the terminal apparatus 1 according to the present embodiment. The terminal apparatus 1 configures multiple beam pair links for monitoring the downlink control channel (S3001). The terminal apparatus 1 after configuring multiple beam pair links for monitoring the downlink control channel monitors a quality of each of the multiple beam pair links (S3002). In a case that, among multiple beam pair links of which the qualities are monitored, the qualities of a prescribed number of beam pair links decrease and a beam pair link failure is detected, the terminal apparatus 1 triggers a beam pair link status reporting (S3003). The triggered beam pair link status reporting is cancelled in a case that a prescribed condition is met (S3004).

Note that an uplink resource used for reporting a beam pair link status may be a physical uplink shared channel (PUSCH) allocated from the base station apparatus 3.

In a case that the terminal apparatus 1 determines that the beam pair link status reporting has been triggered and is not canceled, the terminal apparatus 1 may perform the following procedures.

In a case that the MAC entity for the terminal apparatus 1 has an uplink resource for a new transmission, the terminal apparatus 1 may generate a MAC CE for the beam pair link status reporting. Note that the terminal apparatus 1 that has generated the MAC CE for the beam pair link status reporting may start or restart a timer for retransmission.

In a case that the MAC entity for the terminal apparatus 1 does not have the uplink resource for a new transmission and an uplink grant is not configured, the terminal apparatus 1 may trigger a beam recovery request.

The terminal apparatus 1 may cancel the triggered beam pair link status reporting in a case that the quality of the beam pair link for the monitored NR-PDCCH has been improved.

The terminal apparatus 1 may cancel the triggered beam pair link status reporting in a case that the beam pair link status report is included in a MAC PDU to be transmitted.

Note that there may be at most one beam pair link status report that MAC entities transmit at a Transmission Time Interval (TTI) at most.

The terminal apparatus 1 according to the present embodiment may trigger a beam recovery request to the base station apparatus 3 in a case of a prescribed condition in the MAC layer and/or the RRC layer. For example, the terminal apparatus 1 may trigger a beam recovery request in a case that a beam pair link failure is detected. For example, the terminal apparatus 1 may trigger the beam recovery request in a case that the beam pair link status reporting is triggered and the terminal apparatus 1 does not have an uplink resource for beam pair link status reporting.

Figure 10:
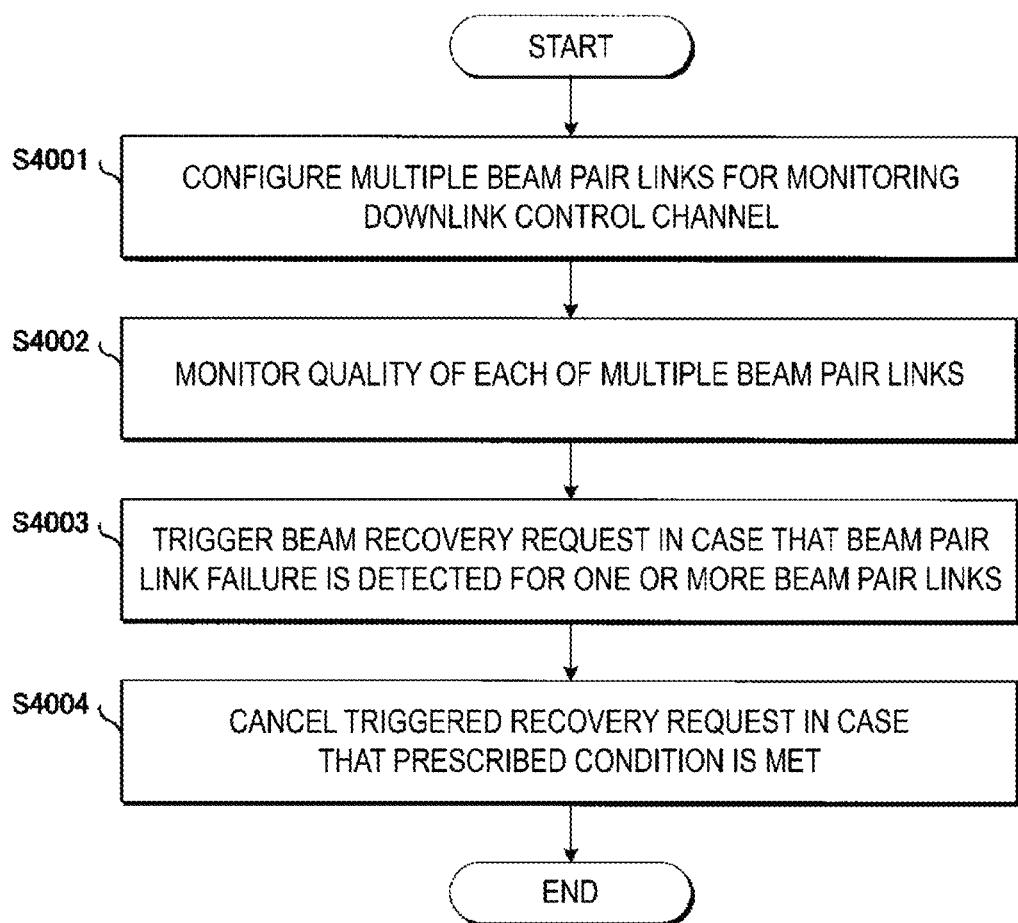
FIG. 10 is a flowchart illustrating an example of transmitting a downlink control channel in a base station apparatus 3 according to the embodiment of the present invention.

FIG. 10 is a flowchart illustrating an example of triggering a beam recovery request in the terminal apparatus 1 according to the present embodiment. The terminal apparatus 1 configures multiple beam pair links for monitoring the downlink control channel (S4001). The terminal apparatus 1 after configuring multiple beam pair links for monitoring the downlink control channel monitors a quality of each of the multiple beam pair links (S4002). In a case that, among multiple beam pair links of which the qualities are monitored, the qualities of a prescribed number of beam pair links decrease and a beam pair link failure is detected, the terminal apparatus 1 triggers a beam recovery request (S4003). The triggered beam recovery request is cancelled in a case that a prescribed condition is met (S4004).

Note that the triggered beam recovery request may be treated as in a pending state until canceled.

Note that the beam recovery request in the pending state may be canceled in a case that the terminal apparatus 1 receives a new configuration of the beam pair link for monitoring the NR-PDCCH.

Note that the beam recovery request in the pending state may be cancelled in a case that a MAC PDU is assembled and the PDU includes the beam pair link status report.

Note that the beam recovery request in the pending state may be canceled in a case that the terminal apparatus 1 detects the NR-PDCCH in a prescribed search space.

Note that the beam recovery request may be used for the terminal apparatus 1 to request a new configuration of the beam pair link for monitoring the NR-PDCCH to the base station apparatus 3.

Note that the beam recovery request may be used for the terminal apparatus 1 to request an uplink resource for beam pair link status reporting to the base station apparatus 3.

Note that the beam recovery request may be used for the terminal apparatus 1 to indicate information associated with one or more of multiple downlink transmission beams available to the base station apparatus 3.

The terminal apparatus 1 may set a beam recovery request counter to zero in a case that the terminal apparatus 1 triggers the beam recovery request.

The terminal apparatus 1 may initiate a random access procedure in a case that the beam recovery request is pending and the terminal apparatus 1 does not have the uplink resource valid for the beam recovery request in any TTI.

The terminal apparatus 1 may perform the following process in a case that the beam recovery request is pending and the terminal apparatus 1 has the uplink resource valid for the beam recovery request in a certain TTI.

The terminal apparatus 1 may increment the beam recovery request counter in a case that the beam recovery request counter is less than the upper limit value of the beam recovery request counter.

The terminal apparatus 1 may indicate signaling the beam recovery request using the uplink resource for the beam recovery request to the physical layer in a case that the beam recovery request counter is less than the upper limit value of the beam recovery request counter.

The terminal apparatus 1 may start a beam recovery request prohibition timer in a case that the beam recovery request counter is less than the upper limit value of the beam recovery request counter.

The terminal apparatus 1 may cancel the pending beam recovery request in a case that the beam recovery request counter is equal to the upper limit value of the beam recovery request counter (the case of being greater than the upper limit value may be included).

The terminal apparatus 1 may initiate the random access procedure in a case that the beam recovery request counter is equal to the upper limit value of the beam recovery request counter (the case of being greater than the upper limit value may be included).

Note that in a case that the beam recovery request prohibition timer is running, the terminal apparatus 1 may not increment the beam recovery request counter, signal the beam recovery request, and/or initiate the beam recovery request prohibition timer.

The uplink resource used for the beam recovery request may be an uplink resource associated with one or more of one or more reference signals received by the terminal apparatus 1.

The uplink resource used for the beam recovery request may be an uplink resource associated with the beam pair link of which the best beam pair link quality is the best among one or more beam pair links on which the terminal apparatus 1 monitors the NR-PDCCH.

The uplink resource used for the beam recovery request may be an uplink resource associated with a reference signal with the best received power (for example, RSRP) among one or more reference signals received by the terminal apparatus 1.

Note that the beam recovery request may be a scheduling request using a prescribed uplink resource. For example, the beam recovery request may be a scheduling request transmitted using the uplink resource associated with one or more of one or more reference signals received by the terminal apparatus 1.

The terminal apparatus 1 that has performed the beam recovery request on the base station apparatus 3 may monitor a response to the beam recovery request from the base station apparatus 3 in a prescribed period.

The base station apparatus 3 that has received the beam recovery request from the terminal apparatus 1 may transmit a response to the beam recovery request to the terminal apparatus 1.

The base station apparatus 3 that has received the beam recovery request from the terminal apparatus 1 may select a downlink transmission beam for transmitting a downlink control channel to the terminal apparatus 1, based on the uplink resource used for the beam recovery request.

Note that the response to the beam recovery request transmitted by the base station apparatus 3 may be a configuration notification indicating one or more search spaces for the terminal apparatus 1 to monitor the NR-PDCCH. Note that the configuration indicating one or more search spaces for the terminal apparatus 1 to monitor the NR-PDCCH may be a configuration indicating one or more of multiple search space candidates configured in the RRC layer. Note that one or more search spaces for the terminal apparatus 1 to monitor the NR-PDCCH may be indicated by bit map information in which a bit is associated with each of multiple search space candidates. The terminal apparatus 1 that has performed the beam recovery request may update one or more search spaces to monitor the NR-PDCCH, based on the response to the beam recovery request received from the base station apparatus 3. Note that the terminal apparatus 1 that has performed the beam recovery request may change a downlink reception beam (which may be a downlink beam pair link) for monitoring one or more NR-PDCCHs, based on the response to the beam recovery request received from the base station apparatus 3.

The base station apparatus 3 that has received the beam recovery request from the terminal apparatus 1 may transmit, to the terminal apparatus 1, an NR-PDCCH including an uplink grant for the terminal apparatus 1 to transmit a downlink beam pair link status report.

The terminal apparatus 1 that has detected the NR-PDCCH including the uplink grant for transmitting the downlink beam pair link status report may perform the beam pair link status reporting using the uplink resource indicated by the uplink grant.

Note that the beam pair link status report transmitted by the terminal apparatus 1 may be a report of the received power of each of one or more reference signals transmitted from the base station apparatus 3. Note that the received power of each of one or more reference signals may be a received power in a case that a reception beam having the highest power is used among multiple reception beams which the terminal apparatus 1 can apply in receiving each of the reference signals.

Note that the beam pair link status report transmitted by the terminal apparatus 1 may be index information indicating one or more of one or more reference signals transmitted from the base station apparatus 3. The terminal apparatus 1 may generate the index information, based on the received power of the received one or more reference signals.

The terminal apparatus 1 performing the beam pair link status reporting may generate the MAC CE for the beam pair link status reporting in the MAC layer. The MAC CE for the beam pair link status reporting may include one or more pieces of index information associated with one or more reference signals.

After performing the beam pair link status reporting, the terminal apparatus 1 that was unable to detect a response to the beam pair link status report in a prescribed period may again perform the beam pair link status reporting.

The terminal apparatus 1 may consider that the beam pair link status reporting has failed and proceed to the random access procedure in a case that the terminal apparatus 1 cannot detect the response to the beam pair link status report even in a case that the beam pair link status reporting has been performed a prescribed number of times (which may be one time). The terminal apparatus 1 after proceeding to the random access procedure detects one or more synchronization signals, and transmits a random access preamble using a random access resource associated with one of the detected one or more synchronization signals.

The search space in the present embodiment may be rephrased into a physical downlink control channel region. In this case, one or more search spaces may be present in the physical downlink control channel region.

Figures 11A, 11B, 11C:
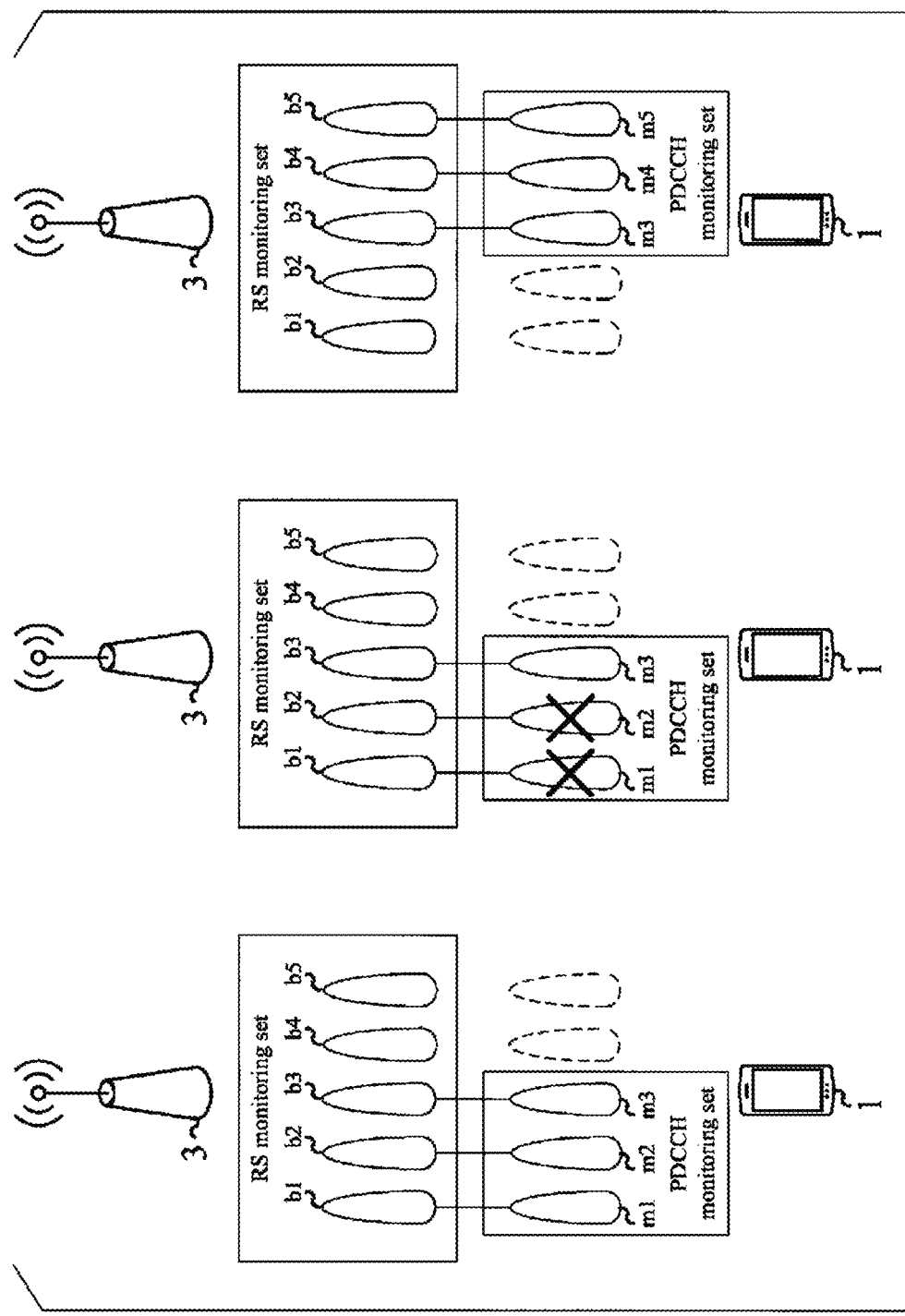
FIGS. 11A to 11C are conceptual diagrams illustrating examples of a case that a downlink control channel region monitored by the terminal apparatus 1 is changed according to the embodiment of the present invention.

FIGS. 11A to 11C are conceptual diagrams illustrating examples of a case that a downlink control channel region monitored by the terminal apparatus 1 is changed in the present embodiment.

In FIG. 11A, the base station apparatus 3 transmits reference signals to the terminal apparatus 1 by using five transmission beams b1, b2, b3, b4, and b5. The terminal apparatus 1 monitors each of the reference signals transmitted by the five transmission beams, and reports the received power and/or reception quality based on the respective reception characteristics to the base station apparatus 3. The terminal apparatus 1 monitors the NR-PDCCH in the downlink control channel region associated with beam pair links m1, m2, and m3 (which may be a configuration using the index of the reference signal, the index of the transmission beam, or the like) configured by the base station apparatus 3. Note that the beam pair links m1, m2, and m3 may be associated with the transmission beam b1, b2, and b3, respectively. The terminal apparatus 1 monitors a quality of each of the configured beam pair links m1, m2, and m3.

In FIG. 11B, in a case that some of the qualities of the beam pair links m1, m2, and m3 monitored by the terminal apparatus 1 are worse than a threshold value, the terminal apparatus 1 considers a beam pair link failure. In a case that a beam pair link failure occurs, the terminal apparatus 1 transmits a beam recovery request and/or a beam pair link status report to the base station apparatus 3.

In FIG. 11C, the base station apparatus 3 that has received the beam recovery request and/or the beam pair link status report from the terminal apparatus 1 notifies, to the terminal apparatus 1, that the downlink control channel region for the terminal apparatus 1 to monitor the NR-PDCCH is to be a downlink control channel region associated with the beam pair links m3, m4, and m5. Note that the beam pair links m3, m4, and m5 may be associated with the transmission beams b3, b4, and b5, respectively.

As illustrated in FIGS. 11A to 11C, the base station apparatus 3 according to the present embodiment may notify the terminal apparatus 1 of the configuration information that the NR-PDCCH is to be monitored in a downlink control channel region associated with one or more of multiple reference signals (which may be beams or transmission beams) of which the reception characteristics the terminal apparatus 1 monitors.

Note that a link or reference signal associated with the NR-PDCCH may be referred to as a serving beam group. A serving beam group activated by the MAC may be referred to as an activated serving beam group. As another example, activated PDCCH and reference signals or links may be referred to as a serving beam group.

Hereinafter, configurations of apparatuses according to the present embodiment will be described.

Figure 12:
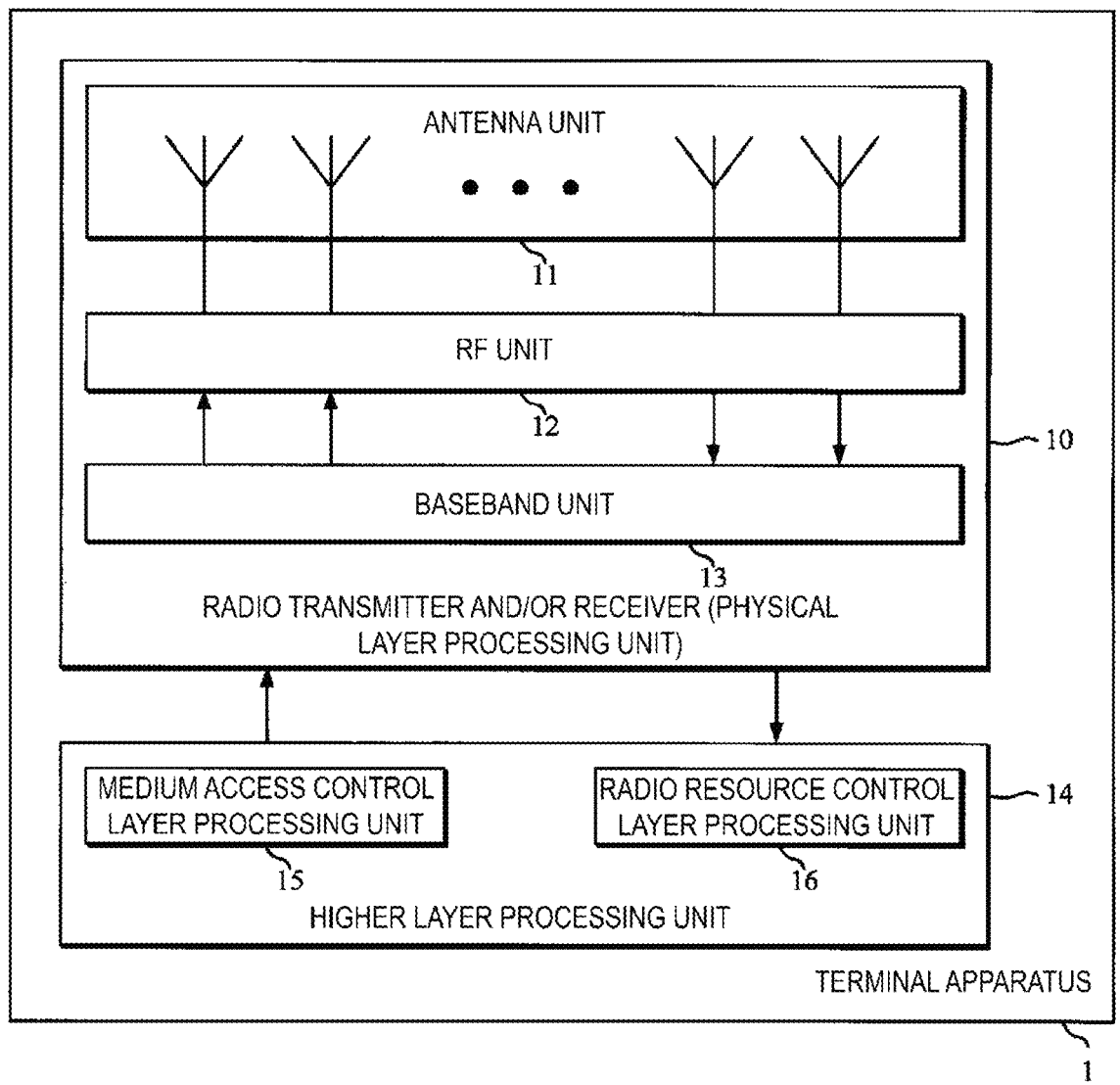
FIG. 12 is a schematic block diagram illustrating a configuration of the terminal apparatus 1 according to the embodiment of the present invention.

FIG. 12 is a schematic block diagram illustrating a configuration of the terminal apparatus 1 according to the present embodiment. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a monitor, or a physical layer processing unit. The higher layer processing unit 14 is also referred to as a measurement unit or a controller.

The higher layer processing unit 14 outputs uplink data (which may be as referred as a transport block) generated by a user operation or the like, to the radio transmission and/or reception unit 10. The higher layer processing unit 14 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing for the Medium Access Control layer (MAC layer). The medium access control layer processing unit 15 controls transmission of a scheduling request, based on various types of configuration information/parameters managed by the radio resource control layer processing unit 16. The medium access control layer processing unit 15 may control transmission of a beam recovery request. The medium access control layer processing unit 15 may control transmission of a beam pair link status report.

The radio resource control layer processing unit 16 included in the higher layer processing unit 14 performs processing for the RRC layer (radio resource control layer). The radio resource control layer processing unit 16 manages various types of configuration information/parameters of its own apparatus. The radio resource control layer processing unit 16 sets various types of configuration information/parameters based on higher layer signaling received from the base station apparatus 3. Namely, the radio resource control layer processing unit 16 sets the various types of configuration information/parameters in accordance with the information indicating the various types of configuration information/parameters received from the base station apparatus 3.

The radio transmission and/or reception unit 10 performs processing for the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and transmits the generated signal to the base station apparatus 3. The radio transmission and/or reception unit 10 may have a function of receiving information for identifying a configuration of multiple reference signals in a certain cell. The radio transmission and/or reception unit 10 may have a function of receiving multiple reference signals. The radio transmission and/or reception unit 10 may have a function of monitoring reception qualities of multiple downlink beam pair links based on the received one or more reference signals.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds the CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. The RF unit 12 amplifies power. The RF unit 12 may have a function of determining a transmit power of the uplink signal and/or the uplink channel transmitted in the serving cell. The RF unit 12 is also referred to as a transmit power control unit.

Figure 13:
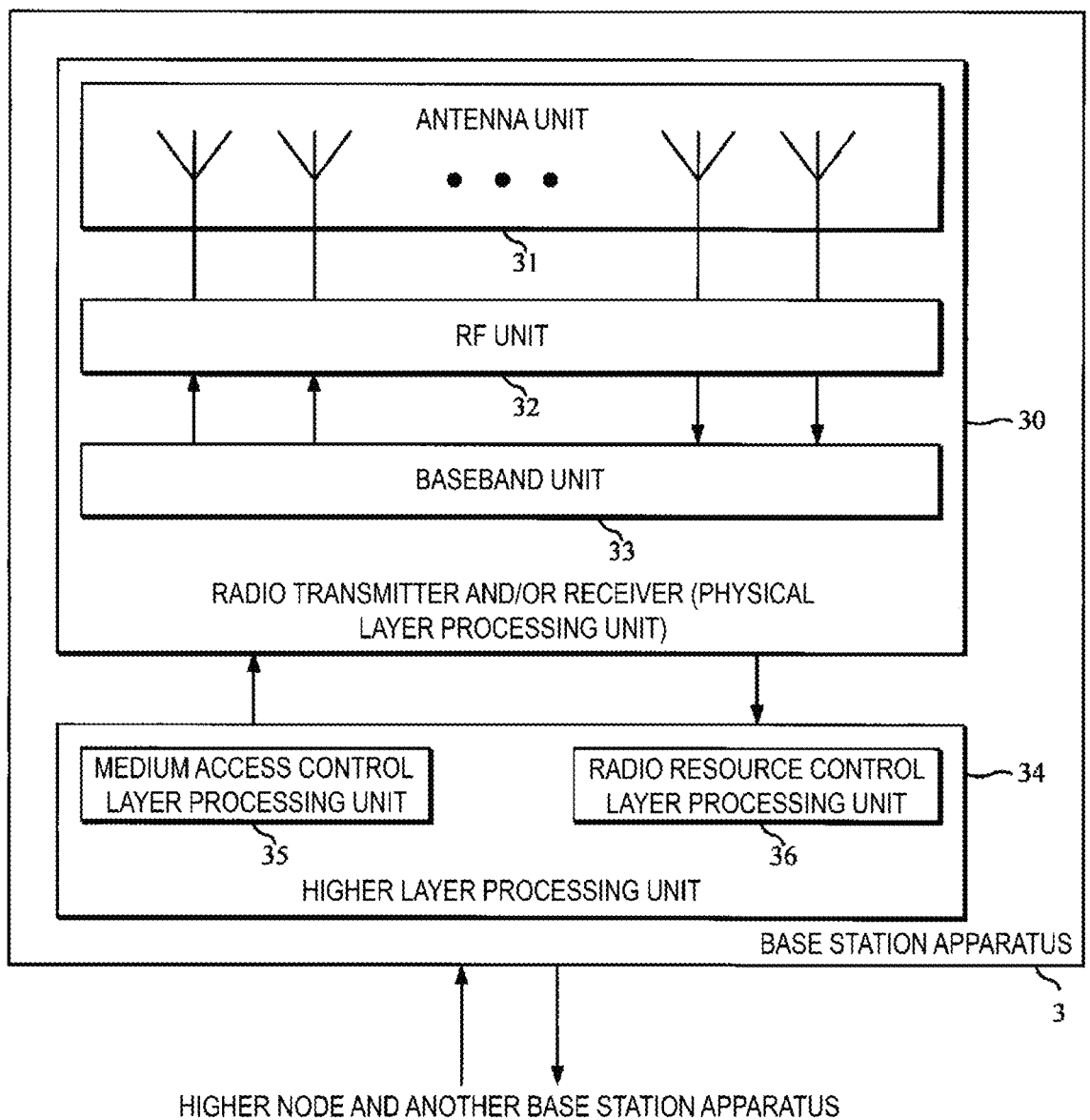
FIG. 13 is a schematic block diagram illustrating a configuration of the base station apparatus 3 according to the embodiment of the present invention.

FIG. 13 is a schematic block diagram illustrating a configuration of the base station apparatus 3 according to the present embodiment. As illustrated in the drawing, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver or a physical layer processing unit. A controller controlling operations of the units, based on various conditions may be separately provided. The higher layer processing unit 34 is also referred to as a terminal control unit.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing for the MAC layer. The medium access control layer processing unit 35 performs processing for a scheduling request, based on various types of configuration information/parameters managed by the radio resource control layer processing unit 36. The medium access control layer processing unit 35 may perform processing for the beam recovery request. The medium access control layer processing unit 35 may perform processing for the beam pair link status reporting.

The radio resource control layer processing unit 36 included in the higher layer processing unit 34 performs processing for the RRC layer. The radio resource control layer processing unit 36 generates, or acquires from a higher node, downlink data (transport blocks) allocated on a physical downlink shared channel, system information, an RRC message, a MAC Control Element (CE) and the like, and outputs the generated or acquired data to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. Namely, the radio resource control layer processing unit 36 transmits/broadcasts information indicating various types of configuration information/parameters. The radio resource control layer processing unit 36 may transmit/broadcast information for identifying a configuration of multiple reference signals in a certain cell.

The radio transmission and/or reception unit 30 has a function to transmit multiple reference signals. The radio transmission and/or reception unit 30 may also have a function of receiving a scheduling request transmitted, from the terminal apparatus 1, using any one of multiple scheduling request resources configured by the higher layer processing unit 34. The radio transmission and/or reception unit 30 may also have a function of transmitting information for identifying a configuration of multiple reference signals in a certain cell. Some of the functions of the radio transmission and/or reception unit 30 other than the above are similar to those of the radio transmission/reception unit 10, and hence a description thereof is omitted. Note that, in a case that the base station apparatus 3 is connected to one or more transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, Serving-GW (S-GW)) and the base station apparatus 3. Although, in FIG. 9, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an application layer processing unit exist in the higher layer processing unit 34. The higher layer processing unit 34 may also have a function of configuring multiple scheduling request resources corresponding respectively to multiple reference signals transmitted from the radio transmission and/or reception unit 30.

The "units" in the drawing refer to constituent elements to provide the functions and the procedures of the terminal apparatus 1 and the base station apparatus 3. Such a constituent element may be represented by different terms such as a section, a circuit, a constituting device, a device, a unit, and the like.

Each of the units designated by the reference signs 10 to 16 included in the terminal apparatus 1 may be configured as a circuit. Each of the units designated by the reference signs 30 to 36 included in the base station apparatus 3 may be configured as a circuit.

Aspects of the terminal apparatus 1 and the base station apparatus 3 according to an aspect of the present invention will be described below.

(1) A first aspect of the present invention is a terminal apparatus 1 including a controller 14 for configuring multiple beam pair links for monitoring a downlink control channel, a monitor unit 10 for monitoring a quality of each of the multiple beam pair links, and a trigger control unit 14 for triggering a beam pair link status reporting in a case that a beam pair link failure is detected in one or more beam pair links among the multiple beam pair links, in which the trigger control unit 14 cancels the triggered beam pair link status reporting on a certain condition.

(2) In the first aspect of the present invention, the certain condition may be that a MAC PDU for transmission includes the beam pair link status report.

(3) In the first aspect of the present invention, a scheduling request may be triggered based on that the beam pair link status reporting is triggered.

(4) In the first aspect of the present invention, a beam recovery request may be triggered based on that the beam pair link status reporting is triggered.

(5) In the first aspect of the present invention, a random access preamble procedure may be initiated in a case that the triggered beam recovery request is pending and the terminal apparatus 1 does not have a physical uplink resource valid for the beam recovery request.

(6) In the first aspect of the present invention, the monitor unit 10 may monitor the quality of each of the multiple beam pair links, based on a reference signal associated with the corresponding beam pair link.

(7) A second aspect of the present invention is a terminal apparatus 1 including a controller 14 for configuring multiple beam pair links for monitoring a downlink control channel, a monitor unit 10 for monitoring a quality of each of the multiple beam pair links, and a trigger control unit 14 for triggering a beam recovery request in a case that a beam pair link failure is detected in one or more beam pair links among the multiple beam pair links, in which the trigger control unit 14 cancels the pending beam recovery request on a certain condition.

(8) In the second aspect of the present invention, the certain condition may be that a MAC PDU is assembled and the MAC PDU includes a beam pair link status report.

(9) In the second aspect of the invention, the certain condition may be to receive an uplink grant associated with the beam recovery request.

(10) In the second aspect of the present invention, the certain condition may be that the triggered beam recovery request is pending and the terminal apparatus 1 does not have a physical uplink resource valid for the beam recovery request.

(11) In the second aspect of the present invention, a random access preamble procedure may be initiated in a case that the triggered beam recovery request is pending and the terminal apparatus 1 does not have a physical uplink resource valid for the beam recovery request.

(12) In the second aspect of the present invention, the terminal apparatus 1 includes a counter 14 incrementing every time the beam recovery request is transmitted, in which the random access preamble procedure may be initiated in a case that a value of the counter 14 is a predetermined value.

(13) In the second aspect of the present invention, the certain condition may be that the value of the counter 14 is the predetermined value.

(14) In the second aspect of the present invention, the monitor unit 10 may monitor the quality of each of the multiple beam pair links, based on a reference signal associated with the corresponding beam pair link.

(15) A third aspect of the present invention is a terminal apparatus 1 including a receiver 10 receiving, from the base station apparatus 3, a signal including first information indicating a resource of each of multiple downlink control channel regions associated with each of the multiple reference signals, and receiving, from the base station apparatus 3, a signal including second information configuring one or more of the multiple downlink control channel regions, and a monitor unit 10 for monitoring the downlink control channel for decoding in the downlink control channel region based on the first information and the second information.

(16) In the third aspect of the present invention, a quality of a link may be monitored in the downlink control channel region based on the first information and the second information.

(17) In the third aspect of the present invention, the first information may be included in an RRC message and the second information may be included in a MAC CE.

(18) A fourth aspect of the present invention is a base station apparatus 3 including a reference signal generation unit 10 generates multiple reference signals to be transmitted to the terminal apparatus 1, and a transmitter 10 for transmitting a signal including first information indicating a resource of each of multiple downlink control channel regions associated with each of the multiple reference signals, transmitting a signal including second information indicating, to the terminal apparatus 1, one or more of the multiple downlink control channel regions, and transmitting the downlink control channel in the downlink control channel region based on the first information and the second information.

A program running on an apparatus according to an aspect of the present invention may serve as a program that controls a Central Processing Unit (CPU) and the like to cause a computer to operate in such a manner as to realize the functions of the above-described embodiment according to the present invention. A program or information handled by the program is transitorily stored in a volatile memory such as a Random Access Memory (RAM), a non-volatile memory such as a flash memory, a Hard Disk Drive (HDD), or other storage device systems.

Note that a program for realizing the functions of the embodiment according to an aspect of the present invention may be recorded in a computer-readable recording medium.

The functions may be realized by causing a computer system to read the program recorded in the recording medium for execution. Note that the "computer system" herein refers to a computer system built into the apparatuses, and the computer system includes an operating system and hardware components such as a peripheral device. The "computer-readable recording medium" may include a semiconductor recording medium, an optical recording medium, a magnetic recording medium, a medium dynamically holding a program for a short time, or other computer-readable recording media.

The respective functional blocks or features of the devices used in the above-described embodiment may be implemented or performed by an electrical circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, a processor of known type, a controller, a micro-controller, or a state machine. The electrical circuit described above may be constituted by a digital circuit, or an analog circuit. Furthermore, in a case that with advances in semiconductor technology, a circuit integration technology appears that replaces the present integrated circuits, one or more aspects of the present invention can use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B) Terminal apparatus
3 Base station apparatus
4 Transmission reception point (TRP)
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit
50 Transceiver unit (TXRU)
51 Phase shifter
52 Antenna element

The invention claimed is:

1. A terminal apparatus, comprising:
monitor circuitry configured to:
monitor qualities of one or more radio links, the one or more radio links being associated with one or more reference signals from a base station apparatus; and
monitor a physical downlink control channel (PDCCH) on the one or more radio links, wherein the PDCCH is configured to be decoded in accordance with the one or more reference signals;
physical layer processing circuitry configured to send an indication to higher layer processing circuitry in a case that the qualities of the one or more radio links are worse than a threshold associated with a block error rate; and
the higher layer processing circuitry configured to:
transmit a beam status report via a medium access control-control element (MAC-CE) to the base station apparatus in a case of receiving the indication a number of times and determining that a physical uplink control channel (PUSCH) is available, wherein the MAC-CE is transmitted on the PUSCH; and
transmit a beam recovery request for acquiring the PUSCH in a case of receiving the indication the number of times and determining that the PUSCH is not available.

2. The terminal apparatus according to claim 1, wherein the one or more reference signals comprise one or more channel state information reference signals (CSI-RSs).

3. The terminal apparatus according to claim 1, wherein the higher layer processing circuitry transmits the beam recovery request on an uplink resource associated with at least one of the one or more reference signals.

4. A communication method for a terminal apparatus comprising:
monitoring qualities of one or more radio links, the one or more radio links being associated with one or more reference signals from a base station apparatus;
monitoring a physical downlink control channel (PDCCH) on the one or more radio links, wherein the PDCCH is configured to be decoded in accordance with the one or more reference signals;
sending an indication to higher layer processing circuitry of the terminal apparatus in a case that the qualities of the one or more radio links are worse than a threshold associated with a block error rate;

transmitting a beam status report via a medium access control-control element (MAC-CE) to the base station apparatus in a case of receiving, by the higher layer processing circuitry, the indication a number of times and determining that a physical uplink control channel (PUSCH) is available, wherein the MAC-CE is transmitted on the PUSCH, and transmitting a beam recovery request for acquiring the PUSCH in a case of receiving the indication the number of times and determining that the PUSCH is not available.

5. The communication method according to claim 4, wherein the one or more reference signals comprise one or more channel state information reference signals (CSI-RSs).

6. The communication method according to claim 4, wherein transmitting the beam recovery request includes transmitting the beam recovery request on an uplink resource associated with at least one of the one or more reference signals.

7. An integrated circuit mounted on a terminal apparatus, the integrated circuit causing the terminal apparatus to:

monitor qualities of one or more radio links, the one or more radio links being associated with one or more reference signals from a base station apparatus;

monitor a physical downlink control channel (PDCCH) on the one or more radio links, wherein the PDCCH is configured to be decoded in accordance with the one or more reference signals;

send an indication to higher layer processing circuitry of the integrated circuit in a case that the qualities of the one or more radio links are worse than a threshold associated with a block error rate; and transmit a beam status report via a medium access control-control element (MAC-CE) to the in the base station apparatus in a case of receiving, by the higher layer processing circuitry, the indication a number of times and determining that a physical uplink control channel (PUSCH) is available, wherein the MAC-CE is transmitted on the PUSCH; and transmit a beam recovery request for acquiring the PUSCH in a case of receiving the indication the number of times and determining that the PUSCH is not available.

8. The integrated circuit according to claim 7, wherein the one or more reference signals comprise one or more channel state information reference signals (CSI-RSs).

9. The integrated circuit according to claim 7, wherein the terminal apparatus transmits the beam recovery request on an uplink resource with at least one of the one or more reference signals.

* * * * *